United States Patent
Wang et al.

(10) Patent No.: US 8,363,969 B1
(45) Date of Patent: Jan. 29, 2013

(54) SYSTEMS AND METHODS FOR IMAGE CODING AND PROCESSING

(75) Inventors: Haohong Wang, San Jose, CA (US); Li Sha, San Jose, CA (US)

(73) Assignee: Marvell International Ltd., Hamilton (BM)

(*) Notice: Subject to any disclaimer, the term of this patent is extended or adjusted under 35 U.S.C. 154(b) by 835 days.

(21) Appl. No.: 12/534,632

(22) Filed: Aug. 3, 2009

Related U.S. Application Data

(60) Provisional application No. 61/085,977, filed on Aug. 4, 2008, provisional application No. 61/085,494, filed on Aug. 1, 2008, provisional application No. 61/085,491, filed on Aug. 1, 2008.

(51) Int. Cl.
*G06K 9/36* (2006.01)

(52) U.S. Cl. .................................. 382/251

(58) Field of Classification Search ............ 382/232, 382/233, 236, 240, 248, 251; 375/240.02–240.03, 375/240.11–240.16
See application file for complete search history.

(56) References Cited

U.S. PATENT DOCUMENTS

| 6,658,157 | B1 * | 12/2003 | Satoh et al. | 382/239 |
| 2003/0231796 | A1 * | 12/2003 | Caviedes | 382/239 |

* cited by examiner

*Primary Examiner* — Duy M Dang

(57) ABSTRACT

Embodiments of the present invention include systems and methods for processing and coding image data. In one embodiment, image data is coded using a first image coding process. If a bit rate constraint is satisfied, the image data is output. If the bit rate constraint is not satisfied, the image data is coded using a second different coding process. In one embodiment, the second coding process is a layered coding process. In another embodiment, if the constraint is satisfied, quantization data may be included in the output, and may be coded using layered coding. Variable length coding processes and hardware implementations are further disclosed for efficient image processing.

20 Claims, 15 Drawing Sheets

600

| C0 – L0 | C4 S-bits L1 | C5 S-bits L1 | C6 S-bits L1 |
|---|---|---|---|
| | C4 L-bits L2 | C5 L-bits L2 | C6 L-bits L2 |
| C1 S-bits L1 | C7 S-bits L3 | C8 S-bits L3 | C10 S-bits L3 |
| C1 L-bits L2 | C7 L-bits L4 | C8 L-bits L4 | C10 L-bits L4 |
| C2 S-bits L1 | C9 S-bits L3 | C11 S-bits L3 | C13 S-bits L3 |
| C2 L-bits L2 | C9 L-bits L4 | C11 L-bits L4 | C13 L-bits L4 |
| C3 S-bits L1 | C12 S-bits L3 | C14 S-bits L3 | C15 S-bits L3 |
| C3 L-bits L2 | C12 L-bits L4 | C14 L-bits L4 | C15 L-bits L4 |

| Addr XPel | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| YPel | | | | | | | | | | | | | | | | | |
| 0 | 0 | 1 | 2 | 3 | 4 | 5 | 6 | 7 | 8 | 9 | 10 | 11 | 12 | 13 | 14 | 15 | 16 |
| 1 | S+0 | S+1 | S+2 | S+3 | S+4 | S+5 | S+6 | S+7 | S+8 | S+9 | S+10 | S+11 | S+12 | S+13 | S+14 | S+15 | S+16 |
| 2 | 2S+0 | 2S+1 | 2S+2 | 2S+3 | 2S+4 | 2S+5 | 2S+6 | 2S+7 | 2S+8 | 2S+9 | 2S+10 | 2S+11 | 2S+12 | 2S+13 | 2S+14 | 2S+15 | 2S+16 |
| 3 | 3S+0 | 3S+1 | 3S+2 | 3S+3 | 3S+4 | 3S+5 | 3S+6 | 3S+7 | 3S+8 | 3S+9 | 3S+10 | 3S+11 | 3S+12 | 3S+13 | 3S+14 | 3S+15 | 3S+16 |
| 4 | 4S+0 | 4S+1 | 4S+2 | 4S+3 | 4S+4 | 4S+5 | 4S+6 | 4S+7 | 4S+8 | 4S+9 | 4S+10 | 4S+11 | 4S+12 | 4S+13 | 4S+14 | 4S+15 | 4S+16 |
| 5 | 5S+0 | 5S+1 | 5S+2 | 5S+3 | 5S+4 | 5S+5 | 5S+6 | 5S+7 | 5S+8 | 5S+9 | 5S+10 | 5S+11 | 5S+12 | 5S+13 | 5S+14 | 5S+15 | 5S+16 |
| 6 | 6S+0 | 6S+1 | 6S+2 | 6S+3 | 6S+4 | 6S+5 | 6S+6 | 6S+7 | 6S+8 | 6S+9 | 6S+10 | 6S+11 | 6S+12 | 6S+13 | 6S+14 | 6S+15 | 6S+16 |
| 7 | 7S+0 | 7S+1 | 7S+2 | 7S+3 | 7S+4 | 7S+5 | 7S+6 | 7S+7 | 7S+8 | 7S+9 | 7S+10 | 7S+11 | 7S+12 | 7S+13 | 7S+14 | 7S+15 | 7S+16 |
| 8 | 8S+0 | 8S+1 | 8S+2 | 8S+3 | 8S+4 | 8S+5 | 8S+6 | 8S+7 | 8S+8 | 8S+9 | 8S+10 | 8S+11 | 8S+12 | 8S+13 | 8S+14 | 8S+15 | 8S+16 |

Fig. 11

| Addr XPel | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| YPel | | | | | | | | | | | | | | | | | |
| 0 | 0 | 1 | 2 | 3 | 4 | 5 | 6 | 7 | 8 | 9 | 10 | 11 | 12 | 13 | 14 | 15 | 16 |
| 1 | S+0 | - | - | - | - | - | - | - | S+8 | S+9 | S+10 | S+11 | S+12 | S+13 | S+14 | S+15 | S+16 |
| 2 | - | - | - | - | - | - | - | - | 2S+8 | 2S+9 | 2S+10 | 2S+11 | 2S+12 | 2S+13 | 2S+14 | 2S+15 | 2S+16 |
| 3 | - | - | - | - | - | - | - | - | 3S+8 | 3S+9 | 3S+10 | 3S+11 | 3S+12 | 3S+13 | 3S+14 | 3S+15 | 3S+16 |
| 4 | - | - | - | - | - | - | - | - | 4S+8 | 4S+9 | 4S+10 | 4S+11 | 4S+12 | 4S+13 | 4S+14 | 4S+15 | 4S+16 |
| 5 | - | - | - | - | - | - | - | - | - | - | - | - | - | - | - | - | 5S+16 |
| 6 | - | - | - | - | - | - | - | - | - | - | - | - | - | - | - | - | 6S+16 |
| 7 | - | - | - | - | - | - | - | - | - | - | - | - | - | - | - | - | 7S+16 |
| 8 | 8S+0 | 8S+1 | 8S+2 | 8S+3 | 8S+4 | 8S+5 | 8S+6 | 8S+7 | 8S+8 | 8S+9 | 8S+10 | 8S+11 | 8S+12 | 8S+13 | 8S+14 | 8S+15 | 8S+16 |

| | | | | | | | | | |
|---|---|---|---|---|---|---|---|---|---|
| Tile(0,0) | Tile(0,1) | Tile(0,2) | Tile(0,3) | Tile(0,4) | Tile(0,5) | Tile(0,6) | Tile(0,7) | Tile(0,8) | Tile(0,9) |
| Tile(1,0) | Tile(1,1) | Tile(1,2) | Tile(1,3) | Tile(1,4) | Tile(1,5) | Tile(1,6) | Tile(1,7) | Tile(1,8) | Tile(1,9) |
| Tile(2,0) | Tile(2,1) | Tile(2,2) | Tile(2,3) | Tile(2,4) | Tile(2,5) | Tile(2,6) | Tile(2,7) | Tile(2,8) | Tile(2,9) |
| Tile(3,0) | Tile(3,1) | Tile(3,2) | Tile(3,3) | Tile(3,4) | Tile(3,5) | Tile(3,6) | Tile(3,7) | Tile(3,8) | Tile(3,9) |
| Tile(4,0) | Tile(4,1) | Tile(4,2) | Tile(4,3) | Tile(4,4) | Tile(4,5) | Tile(4,6) | Tile(4,7) | Tile(4,8) | Tile(4,9) |
| Tile(5,0) | Tile(5,1) | Tile(5,2) | Tile(5,3) | Tile(5,4) | Tile(5,5) | Tile(5,6) | Tile(5,7) | Tile(5,8) | Tile(5,9) |
| Tile(6,0) | Tile(6,1) | Tile(6,2) | Tile(6,3) | Tile(6,4) | Tile(6,5) | Tile(6,6) | Tile(6,7) | Tile(6,8) | Tile(6,9) |
| Tile(7,0) | Tile(7,1) | Tile(7,2) | Tile(7,3) | Tile(7,4) | Tile(7,5) | Tile(7,6) | Tile(7,7) | Tile(7,8) | Tile(7,9) |
| Tile(8,0) | Tile(8,1) | Tile(8,2) | Tile(8,3) | Tile(8,4) | Tile(8,5) | Tile(8,6) | Tile(8,7) | Tile(8,8) | Tile(8,9) |
| Tile(9,0) | Tile(9,1) | Tile(9,2) | Tile(9,3) | Tile(9,4) | Tile(9,5) | Tile(9,6) | Tile(9,7) | Tile(9,8) | Tile(9,9) |

1201, 1202, 1203, 1204, 32 tiles/page

Fig. 12

|  | 32 tiles/page | | | |
|---|---|---|---|---|
| Tile(0,0) | Tile(0,1) | Tile(0,2) | Tile(0,3) |
| Tile(1,0) | Tile(1,1) | Tile(1,2) | Tile(1,3) |
| Tile(2,0) | Tile(2,1) | Tile(2,2) | Tile(2,3) |
| Tile(3,0) | Tile(3,1) | Tile(3,2) | Tile(3,3) |
| Tile(4,0) | Tile(4,1) | Tile(4,2) | Tile(4,3) |
| Tile(5,0) | Tile(5,1) | Tile(5,2) | Tile(5,3) |
| Tile(6,0) | Tile(6,1) | Tile(6,2) | Tile(6,3) |
| Tile(7,0) | Tile(7,1) | Tile(7,2) | Tile(7,3) |

(32 tiles/page vertical)

Fig. 13A

|  | 32 tiles/page | | | |
|---|---|---|---|---|
| T(0,0)(0,1) | EMP | T(0,2)(0,3) | EMP |
| T(1,0) | T(1,1) | T(1,2)(1,3) | EMP |
| T(2,0)(2,1) | EMP | T(2,2)(2,3) | EMP |
| T(3,0)(3,1) | EMP | T(3,2)(3,3) | EMP |
| T(4,0)(4,1) | EMP | T(4,2) | EMP |
| T(5,0)(5,1) | EMP | T(5,2)(5,3) | EMP |
| T(6,0) | T(6,1) | T(6,2)(6,3) | EMP |
| T(7,0)(7,1) | EMP | T(7,2)(7,3) | EMP |

(32 tiles/page vertical)

Fig. 13B

SYSTEMS AND METHODS FOR IMAGE CODING AND PROCESSING

CROSS REFERENCE TO RELATED APPLICATIONS

This application claims the benefit of priority from U.S. Provisional Application No. 61/085,977, filed Aug. 4, 2008, entitled "Layered Image Coding Scheme for Bitrate Constrained Applications," the entire disclosure of which is hereby incorporated herein by reference. This application also claims the benefit of priority from U.S. Provisional Application No. 61/085,494, filed Aug. 1, 2008, entitled "A Novel Visual Data Compression Algorithm," the entire disclosure of which is hereby incorporated herein by reference. This application also claims the benefit of priority from U.S. Provisional Application No. 61/085,491, filed Aug. 1, 2008, entitled "Unified Memory Traffic Reduction Mechanism for SoC," the entire disclosure of which is hereby incorporated herein by reference.

BACKGROUND

The present invention relates to image processing, and in particular, to systems and methods for processing and coding image data.

For many years, images were processed as analog signals. Traditionally, analog signal representations of still or moving images were used to represent a color space such as Red-Green-Blue (RGB) or Luminance and Chrominance (e.g., YUV). The analog color space signals were then used for broadcasting, transmission, or to drive the mechanisms of a CRT tube, for example, to display the images to an audience. With the growth of digital technology, it became possible to store, transfer, and display images using digital signals. Using digital technology, still images or video can be represented as digital data (i.e., image data), and then processed, transmitted, displayed, or stored as zeros and ones.

The growth of digital mechanisms for generating digital image data has led to an ever increasing amount of digital image data and a corresponding increase in demand for image data processing capacity. For example, digital still cameras, digital video cameras, digital video broadcasting (e.g., set top cable boxes), and computer generated graphic images have led to an explosion in the amount of digital image data that requires some form of processing. To understand the magnitude of the challenge, it is important to understand that images, videos, and graphics contain extraordinarily large amounts of information. In a digital still image, such as images from a digital camera, image data may represent an image at a single point in time. In digital video, a constant flow of image data may create the illusion of movement on a display. It is generally desirable to display images such that any distortion of the image is imperceptible to the human eye. For instance, digital still images are static and may not change. Accordingly, digital still images may require large amounts of information so that the human eye cannot perceive any distortion in the colors or shapes in the image. On the other hand, digital video requires even more image data to represent changing images over time. Accordingly, storing, transmitting, processing, and displaying large amounts of information is an ongoing technical challenge.

Typically, images are represented as frames. Each frame may include numerous pixels arranged in an array, where each pixel is used to represent a particular color combination at a particular point in the frame. The display resolution of a digital television or display typically refers to the number of columns and rows of pixels creating the display (e.g., 1280×1024). Accordingly, a single frame to be displayed on a 1280×1024 display may similarly comprise 1280×1240 pixels. Each pixel, in turn, may be represented digitally in a particular color space and format. For example, one format for an RGB pixel may have a color value represented as three (3) bytes—one 8-bit byte for Red, one 8-bit byte for Green, and one 8-bit byte for Blue. From the above example, it can be seen that a single frame may include 1280×1240×3×8=4 MBytes. Higher resolution images or graphics or long duration video can easily increase the amount of image data to tens or hundreds of MBytes or even many GBytes.

To overcome the challenges faced by the magnitude of data associated with image processing, a variety of formats and coding technologies have emerged to reduce the amount of image data to be processed while maintaining as much of the image quality as possible. Image formatting typically refers to the way digital data is organized and processed. For example, the image data may be in an ARGB format, where each pixel may include four (4) 8-bit bytes—one for transparency, A, and one for each of R, G, and B, as described above—and the pixels are organized and process in 8×4 blocks (or data units). Alternatively, the image data may be in a YUV format, where each pixel may include 4-bits for Y, 2-bits for U, and 2-bits for V (denoted YUV 4:2:2), and the pixels are organized and processes in 16×4 blocks, for example. Generally, there are two categories of coding schemes—lossless coding and lossy coding. Lossless coding reduces the amount of image data required to represent an image or video, while maintaining the full integrity of the source image or video. Lossy coding reduces the amount of image data, but may result in some degradation of the image quality.

One problem with existing digital image systems is the large number of formats and coding schemes that are used to encode image data. It is computationally intensive to process numerous different images that may be received in different formats and coding schemes. Additionally, in many applications, it may be desirable to obtain and use new coding schemes with particular properties and/or advantages that are not available in existing coding schemes. Further, it may be desirable to provide a system architecture for efficiently processing digital image data.

SUMMARY

Embodiments of the present invention include systems and methods for processing and coding image data. In one embodiment, image data is coded using a first image coding process. If a bit rate constraint is satisfied, the image data is output. If the bit rate constraint is not satisfied, the image data is coded using a second different coding process. In one embodiment, the second coding process is a layered coding process. In another embodiment, if the constraint is satisfied, quantization data may be included in the output, and may be coded using layered coding.

In one embodiment, the present invention includes a method for compressing image data comprising receiving image data as a plurality of arrays of pixels, transforming the arrays of pixels to produce corresponding matrices of coefficients, coding the matrices of coefficients using a first image coding process to produce a coded bit stream, and comparing the coded bit stream to a bit rate constraint. If the coded bit stream satisfies the bit rate constraint, then the coded bit stream is produced as an output, and if the coded bit stream does not satisfy the bit rate constraint, then the matrices of coefficients are coded using a second image coding process to produce the coded bit stream.

In one embodiment, the present invention includes an image processing system comprising a memory and an image processor to store and retrieve image data from the memory, the image processor further to receive image data as a plurality of arrays of pixels, transform the arrays of pixels to produce corresponding matrices of coefficients, code the matrices of coefficients using a first image coding process to produce a coded bit stream, and compare the coded bit stream to a bit rate constraint. If the coded bit stream satisfies the bit rate constraint, then the coded bit stream is produced as an output, and if the coded bit stream does not satisfy the bit rate constraint, then the matrices of coefficients are coded using a second image coding process to produce the coded bit stream.

An image processing system comprising a coder-decoder, an image processing block, and one or more pins to communicate image data between an external memory and the coder-decoder and image processing block, where image data is received in the coder-decoder on the one or more pins and is coded using a first image coding process, where said coder-decoder decodes the image data, and where the coder-decoder encodes the image data using a second image coding process and stores the coded image data in the memory for access by the image processing block.

The following detailed description and accompanying drawings provide additional understanding of the nature and advantages of the present invention.

BRIEF DESCRIPTION OF THE DRAWINGS

FIG. 6 illustrates another example of layered coding.

FIG. 10 illustrates a memory structure according to an embodiment of the present invention.

FIG. 11 illustrates another memory structure according to an embodiment of the present invention.

FIG. 12 illustrates yet another memory structure according to an embodiment of the present invention.

FIGS. 13A-B illustrate a compression scheme for a tile-based memory structure according to an embodiment of the present invention.

DETAILED DESCRIPTION

Described herein are systems and methods for systems and methods for processing and coding image data. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
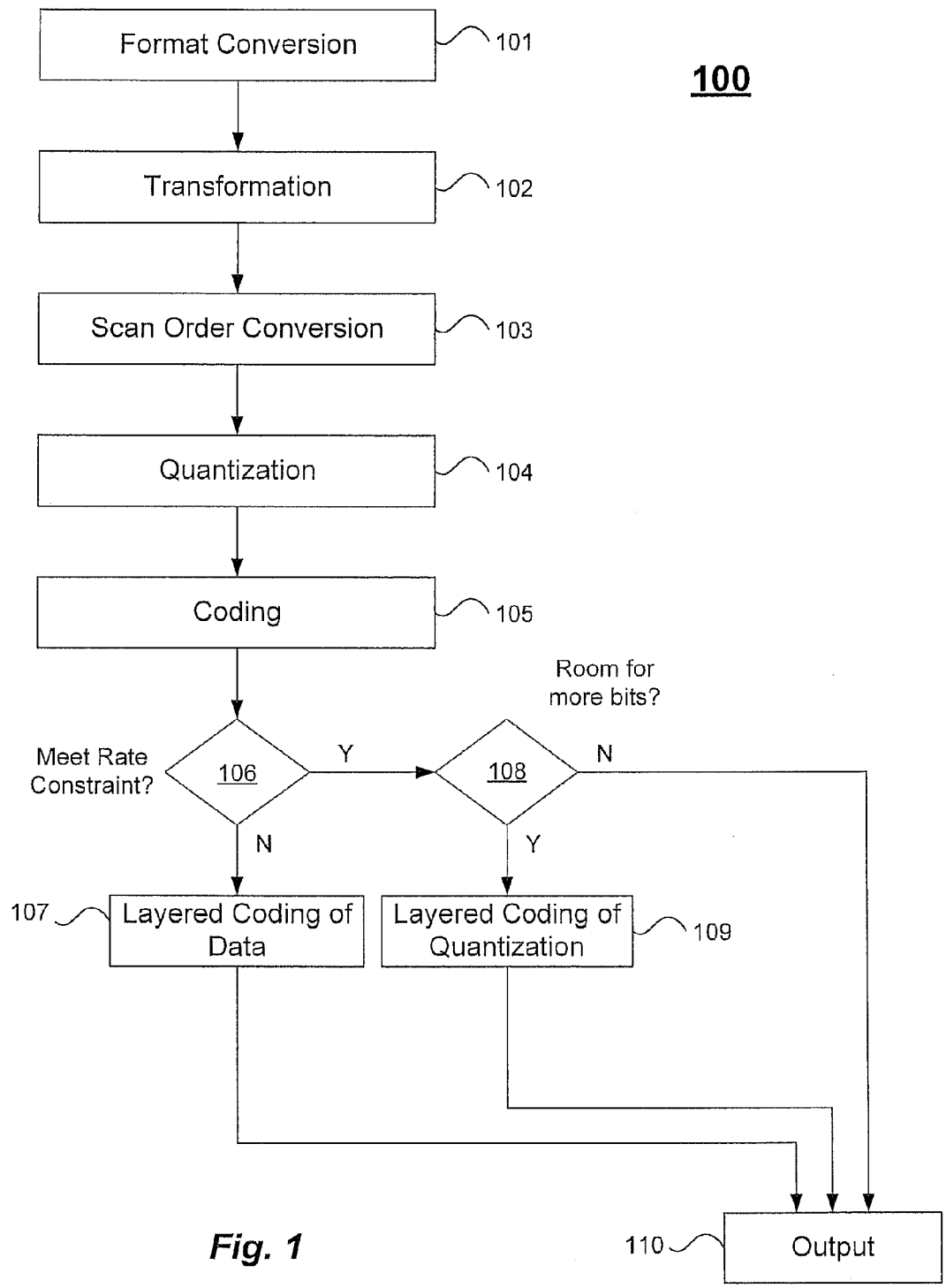
FIG. 1 illustrates an image processing method according to one embodiment of the present invention.

FIG. 1 illustrates an image processing method according to one embodiment of the present invention. One feature of the present invention includes an image processing method 100 that can receive a plurality of different image data inputs in a plurality of different formats. At 101, image data inputs having different formats are converted to a common format. As mentioned above, the image data may include a plurality of frames, each of which has a plurality of data units (arrays of pixels or "pixel arrays"). In one example embodiment described below, an algorithm receives and processes 4×4 pixel arrays to produce a coded output stream, for example. At 102, the image data may be transformed. One example transformation is the Discrete Cosine Transform ("DCT") for example. Another example is a Harr wavelet transform. The transformation results in an array (or matrix) of coefficients, Cn, that represent the image and may redistribute the energy in a pixel array. Each coefficient matrix may be related to a particular pixel array. The matrix of coefficients may be organized according to a predefined scan order, which specifies the order in which coefficients in the matrix are processed. The scan order may be converted at 103 so that particular coefficients are processed before other coefficients, for example. At 104, the coefficients are quantized. Example techniques for quantization include dropping 3 bits, which is a divide by 8 to reduce the signal magnitude and reduce the number of bits required to represent the signal. At 105, the coefficients are coded using an image coding process. In one embodiment, an entropy coding technique is used. One example coding technique may be a variable length code ("VLC"). Another example may include an arithmetic code. Features and advantages of some embodiments of the present invention include optimizing the bit rate constraints by performing alternative coding if the bit rate constraints are not met (e.g., if there is too much data to be transmitted) and by ensuring the bit budget is not underutilized by filling in more bits if there is room in the bit budget. For example, in one embodiment, if the coded image data does not meet the bit rate constraint at 106 (e.g., if there is more image data to be transmitted than allowed or available for a particular transaction), then the image data is coded using another image coding process (e.g., a layered coding process) at 107. The coded image data may then be output at 110. Similarly, if the coded image data is under the bit rate constraint at 106, and there is room for more bits at 108, then quantization data (bits) may be coded (e.g., according to a layered coding scheme) at 109. The coded image data and coded quantization data may then be output at 110. If the coded image data is under the bit rate constraint at 106, but there is no available room for more bits at 108, then the coded image data is output at 110.

In one example embodiment, the method processes image data organized according to different schemes using predefined attributes. For example, each coding process may have a predefined quantization parameter ("QP"), which specifies how lossy the particular coding process may be as follows:

Quantization=$N$/QP;

Where N is the digital value being quantized, QP is the divisor, and QP=1 corresponds to lossless coding. Different example coding schemes are shown in Table 1.

TABLE I

| Functions and Requirements | Scheme A | Scheme B | Scheme C | Scheme D |
|---|---|---|---|---|
| Input Data format | 32-bit ARGB | 16-bit YUV 4:2:2 | 8-bit Luma/ Chroma Data | 16-bit YUV 4:2:2 + 4-bit Motion |
| Data unit for compression | 8 × 4 pixels | 16 × 4 pixels | 32 × 4 pixels | 16 × 1 pixels |
| Compression mode | Lossy/ Lossless | Lossy/ Lossless | Lossless only | Motion: Lossless YUV: Lossy/ Lossless |
| Compression ratio supported | 0, ¼, ½, ¾ or 1 | 0 (detected by z filter) ¼, ½, ¾, 1 | ¼, ½, ¾, 1 | Depending on the QP selection |
| GFX transparency detection inside | Y | N | N | N |
| Z-order filter inside | N | Y | N | N |
| Compression attributes (record code mode) | 4-bit attributes | 4-bit attributes | 2-bit attributes | None |
| Random access is allowed | Y | Y | Y | N |
| Memory access pattern | Tile-based (R, W) Raster (R) | Tile-based (W) Raster (R) | Tile-based (W) Tile-base (R) | Linear (W) Linear (R) |
| Line buffer at decompression side | Y (only for raster scan output) | Y | N | N |
| Bitrate constraints can be applied | Y | Y | N | N |

Process 100 may be carried out using the example coding schemes in Table 1. A compression attribute may be defined to specify particular parameters used in the coding process. For example, the coding process 100 can include a pre-assigned QP, where the unique QP for the process may ensure a constant quality of the picture. As mention above, if the QP is not sufficient for achieving the rate constraints (e.g., if the programmed quantization results in too much image data), a layered coding approach may be used to further reduce the amount of image data to be transmitted, for example. If layered coding is used in the process, this information is reflected in the compression attribute. In one embodiment, the output is coupled to a DDR memory bus, and the specified QP and an upper bound compression ratio determine the number of DDR output bursts for the coded image data. One DDR output burst may include 32 bytes of coded image data, for example. The number of bursts (e.g., DDR bursts) may also be included in the compression attribute. The compression attributes, including the QP information, the compression algorithm used (e.g., VLC only or VLC and layered coding of quantization bits), and the compression ratio, may be sent with the coded image data for use in decoding the image data, for example.

In one example embodiment, three (3) QP values are specified in a 4-bit compression attribute: QP=1, QP=2, and QP=4. The 4-bit compression attribute can represent the 16 possible combined selections of QP, upper bound compression ratio, and z-order/transparency to be used for coding schemes A and B, as follows:

0. Compression ratio=0: which refers to the case where the block is invisible (either transparent or be hidden);
1. Upper bound compression ratio=1: which refers to the case where the selected QP does not help to reduce the burst number for the compressed data, so no compression is conducted, the original data may be stored;
2. Upper bound compression ratio=1/2: which refers to the case where the selected QP=1 cannot meet the 1/2 bitrate constraint, so the layered coding algorithm is used;
3. Upper bound compression ratio=1/4: which refers to the case where the selected QP=2 cannot meet the 1/4 bitrate constraint, so the layered coding algorithm is used;
4. Upper bound compression ratio=1/2: which refers to the case where the selected QP=2 cannot meet the 1/2 bitrate constraint, so the layered coding algorithm is used;
5. Upper bound compression ratio=1/4: which refers to the case where the selected QP=4 cannot meet the 1/4 bitrate constraint, so the layered coding algorithm is used;
6. Upper bound compression ratio=1/2: which refers to the case where the selected QP=4 cannot meet the 1/2 bitrate constraint, so the layered coding algorithm is used;
7. QP=1, actual compression ratio=1/4: algorithm is used with QP=1 and results in 1 burst;
8. QP=1, actual compression ratio=1/2: algorithm is used with QP=1 and results in 2 bursts;
9. QP=1, actual compression ratio=3/4: algorithm is used with QP=1 and results in 3 bursts;
10. QP=2, actual compression ratio=1/4: algorithm is used with QP=2 and results in 1 burst;
11. QP=2, actual compression ratio=1/2: algorithm is used with QP=2 and results in 2 bursts;
12. QP=2, actual compression ratio=3/4: algorithm is used with QP=2 and results in 3 bursts;
13. QP=4, actual compression ratio=1/4: algorithm is used with QP=4 and results in 1 burst;
14. QP=4, actual compression ratio=1/2: algorithm is used with QP=4 and results in 2 bursts;
15. QP=4, actual compression ratio=3/4: algorithm is used with QP=4 and results in 3 bursts.

For scheme C, a 2-bit compression attribute is used to represent the 4 choices of compression ratio:

1. Actual compression ratio=1/4: the lossless result is in 1 burst;
2. Actual compression ratio=1/2: the lossless result is in 2 bursts;
3. Actual compression ratio=3/4: the lossless result is in 3 bursts; and
4. Actual compression ratio=1: the lossless result is in 4 bursts.

The coding process 100 may be performed in accordance with the compression attributes. In this example, format conversion 101 may include a color space conversion. For example, a format conversion may be used in scheme A, where an ARGB (8:8:8:8) format is converted to AYUV (8:8: 8:8) format. Accordingly, in this example, the AYUV (8:8:8: 8) format is the common format used for further processing. Similarly, in scheme B, a YUV 4:2:2 format (or UY'VY" to represent 2 pixels) may be converted to the AYUV (8:8:8:8) format. For the ARGB conversion, a revised version of the reversible conversion adopted in JPEG2000 standard may be use, which is not reversible, so distortion may be introduced in this color space conversion process. Since this is a lossy conversion, this process should be bypassed if lossless compression is required as in scheme C or if QP=1 for scheme A, for example. The example conversion equations are demonstrated in Eq. (1)-(6).

$$Y=[R+(G<<1)+B]>>2 \quad (1)$$

$$U=(B-G+255+x\%2)>>1 \quad (2)$$

$$V=(R-G+y\%2)>>1 \quad (3)$$

and $$G=[(Y>>1)+255+x\%2+y\%2-U-V]>>1 \quad (4)$$

$$R=(V>>1)+G-255-x\%2 \quad (5)$$

$$B=(U>>1)+G-255-y\%2 \quad (6)$$

where (x, y) is the position of the current pixel, "<<" denotes left shift (multiplication), ">>" denotes right shift (division), and "%" denotes the "MOD" operation.

For scheme B, the YUV 4:2:2 format (or UY'VY" to represent 2 pixels) can also be mapped to AYUV (8:8:8:8) format as follows:

$$A=Y, \text{ and } Y=Y'' \quad (7)$$

Therefore, for both scheme A and scheme B, the 128B data input (e.g., ARGB 8×4×4 or YUV 16×4×2) can be converted into AYUV format and reorganized into 8 4×4 blocks for further processing. The converted and reorganized 8 4×4 blocks are A0, Y0, U0, V0, A1, Y1, U1, and V1, where each block contains 16 8-bit intensity values.

Figure 2:
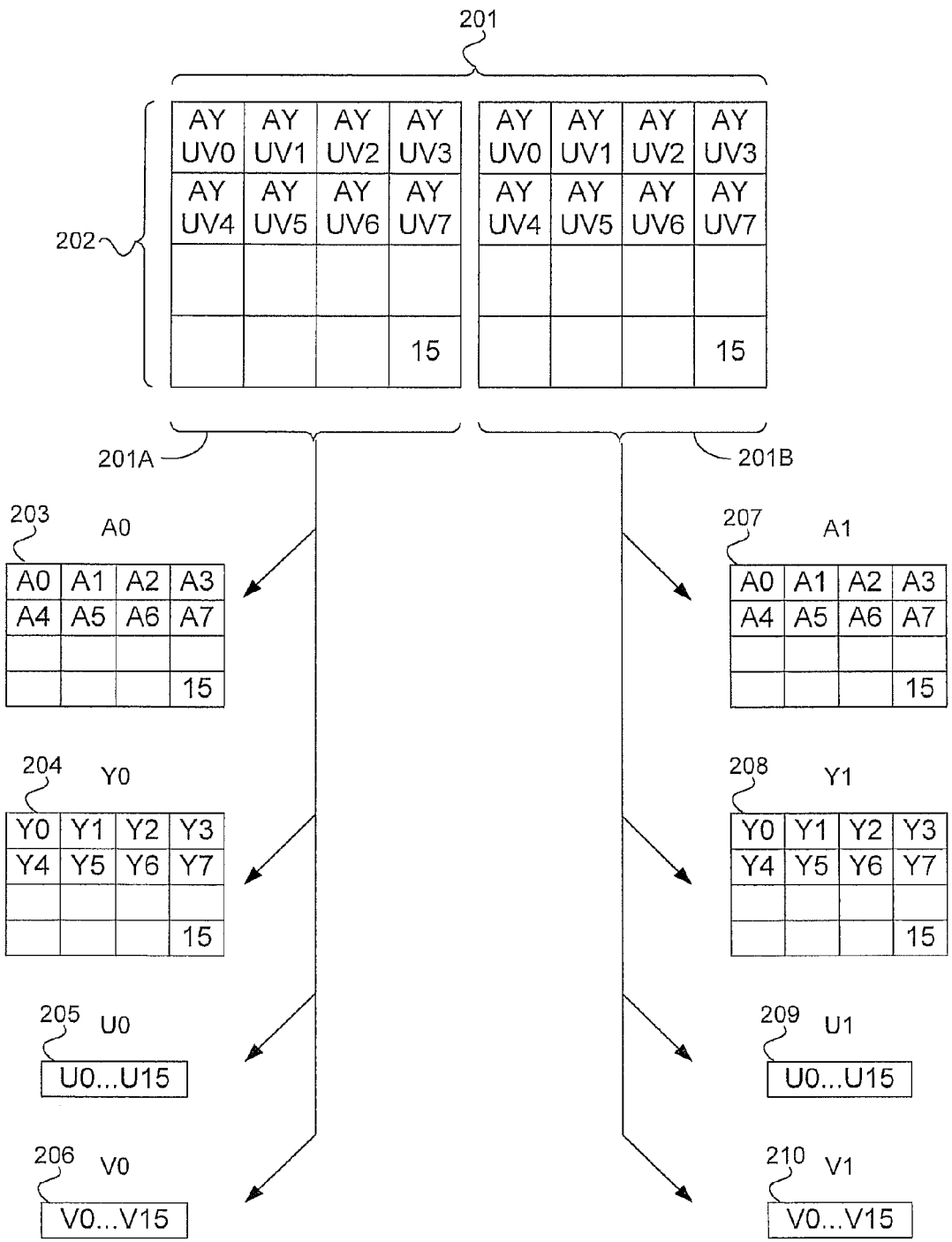
FIG. 2 illustrates an example of an 8×4 AYUV block being reorganized into 8 4×4 blocks.

An example of an 8×4 AYUV block being reorganized into 8 4×4 blocks is illustrated in FIG. 2. FIG. 2 illustrates an 8×4 AYUV block with 8 columns 201 and 4 rows 202 each having a pixel value comprising four (4) 8-bit values AYUV. The columns 201 are partitioned into 2 4×4 blocks 201A and 201B for reorganization. Block 201A includes 16 AYUV pixel values that may be labeled AYUV0 to AYUV15 from left to right and top to bottom. The "A" values in block 201A may be separated and stored in block 203, which is denoted A0 and includes A0-A15 from left to right and top to bottom. Similarly, the "Y", "U", and "V" values in block 201A may be separated and stored in blocks 204-206, respectively, which are denoted Y0, U0, and V0 and include corresponding Y, U and V values from block 201A. Similar 4×4 blocks denoted A1, Y1, U1, and V1 207-210 are derived from block 201B.

In one embodiment, the reorganized pixel values are transformed. In this example, a reversible 4×4 Harr wavelet transform is applied to each of the 4×4 blocks 203-210. The energy of the 4×4 data is compacted into fewer coefficients in the top-left corner of the 4×4 array. The transform may be performed in both the horizontal and vertical direction. The 1D transform can be represented as follows:

$$(a,b,c,d) \rightarrow ([a+b+c+d+2]>>2, [a+b-c-d]>>1, [a-b], [c-d]), \quad (8)$$

and the reverse transform is:

$$(x, y, z, p) \rightarrow ([x-(\{((z+p)>>1)*2-y*2-z*3-p+2\}>>2)]), \quad (9)$$

$$[x-(\{((z+p)>>1)*2-y*2-z*3-p+2\}>>2)-z],$$

$$[x-(\{((z+p)>>1)*2-y*2-z*3-p+2\}>>2)+((z+p)>>1)*2-y-z],$$

$$[x-(\{((z+p)>>1)*2-y*2-z*3-p+2\}>>2+((z+p)>>1)*2-y-z-p]).$$

Figures 3A, 3B, 4A, 4B:
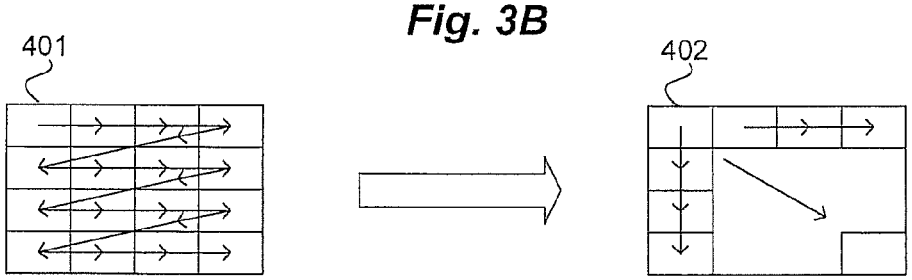
FIGS. 3A-B illustrate transforming an array of pixel values into coefficients.
FIGS. 4A-B illustrate scan order conversion.

FIG. 3A illustrates transforming an array of pixel values into coefficients. In FIG. 3A, the 16 pixel values in the A0 matrix are transformed into a matrix of coefficient values, C0, including 16 entries. The coefficient in the upper left corner is referred to as the DC coefficient, and the other coefficients are referred to as AC coefficients, for example. Each of the other reorganized pixel arrays Y0, U0, V0, A1, Y1, U1, and V1 may also be transformed, resulting in 8 arrays of transform coefficient values representing the image. Considering the input data for the transform is in 8-bit format, the bit-width before and after transform can be derived as shown in FIG. 3B.

FIGS. 4A-B illustrate scan order conversion according to an embodiment of the present invention. As mentioned above, the coefficient values in the coefficient matrices will be processed in a particular order. In one aspect, the present invention includes modifying the order in which the coefficient values are processed (the scan order) to process important data before less important data so that the image integrity is maintained. In FIG. 4A, coefficient matrix 401 is scanned from left to right and top to bottom. Accordingly, the coefficients are processed in order beginning with C0 and ending with C15 for a given coefficient matrix. However, in the example matrix 402, the scan order is changed so that coefficients on the upper left point of the matrix are scanned before coefficients on the lower right point of the matrix. As a specific example, using the coefficient matrix, the coefficients obtained from the transform are re-ordered to move the coefficients with higher magnitude to the beginning.

| 0, | 1, | 2, | 3 |   | 0, | 4, | 5, | 6 |
|---|---|---|---|---|---|---|---|---|
| 4, | 5, | 6, | 7 |   | 1, | 7, | 8, | 10 |
| 8, | 9, | 10, | 11 | → | 2, | 9, | 11, | 13 |
| 12, | 13, | 14, | 15 |   | 3, | 12, | 14, | 15 |

The scan order may be represented in a Table as illustrated in FIG. 4B, for example, where the coefficients are mapped to locations in the matrix to control the order of processing. The table in FIG. 4B illustrates the relationship between scan order and raster scan order, where the rows labeled "coeff" are the scan order index and the rows labeled "location" are the raster scan index.

Some embodiments of the present invention may include a quantization of the coefficients. In one embodiment, quantization includes dividing the coefficients. Specifically, in this example, when QP=2 or 4 (e.g., where qpb=log 2(QP)=1 or 2) the AC coefficients divide themselves by QP to reduce their magnitude as follows:

$$\text{Quantized Coeff } Cq=\text{sign}(C)*[|C|)>>qpb]. \quad (12)$$

Therefore, the dequantized coefficient, Cr, at the decoder side can be derived as: if Cq=0, then:

$$Cr=\text{quant\_error},$$

and otherwise, $$Cr=\text{sign}(Cq)*[(|Cq|<<qpb)+\text{quant\_error}], \quad (13)$$

where the quant_error is a pre-assigned value if no quantization error is encoded in the bitstream. For example, if Cq=0, quant_error=0, otherwise, quant_error=0 for QP=2 and quant_error=1 for QP=4. On the other hand, if the quantization error is coded in the bitstream, then its data range is [−(QP−1), QP−1] if Cq=0, and it is [0, QP−1] if Cq≠0. In one implementation described in more detail below, the 15 AC coefficients may be divided into 2 levels. Coefficients with index from 1 to 6 are in the first level, which may use the assigned QP for quantization. The other level coefficients with index from 7 to 15 may use 2QP for quantization, for example.

A variety of coding techniques may be used in different embodiments. In this example, variable length coding ("VLC coding") is used to code the quantized coefficients. In VLC coding, the DC coefficients and AC coefficients may be coded with different VLC coding tables. The DC values may be coded differentially, that is, the difference between DCs of neighboring blocks (with the same component type) may be coded, and the initial DC is coded with a fixed 8-bit value. In some applications, the differences between DC coefficients may be in the range of [−255, 255]. Accordingly, the following VLC coding table may be used.

TABLE 1

| Abs(DC) | VLC code for range: [−255, 255] |
|---|---|
| 0 | 000 |
| 1-2 | 1xs |
| 3-6 | 001xxs |
| 7-14 | 010xxxs |
| 15-46 | 0110xxxxxs |
| 47-255 | 0111xxxxxxxxs |

In the table above, "Abs(DC)" is the absolute value of the difference between DC coefficients in successive frames, "x" is zero or one for coding purposes, and "s" is a sign bit.

In some applications, the AC values may typically be small at the end of the matrix. In one example implementation, the AC coefficient values in each matrix are classified into one of a plurality of pattern types based on a number of coefficients in each matrix that have values that are less than one or more specified values. For example, a set of small-value friendly VLC tables may be used for coding AC coefficient values based on the pattern of coefficient values in each matrix. There are 4 typical AC pattern types to be considered as follows:

1. The AC coefficients have plenty of trailing 0s;
2. The AC coefficients have plenty of trailing items (coefficients) within the range of [−1, 1];
3. The AC coefficients have plenty of trailing items (coefficients) within the range of [−4, 4];
4. The AC coefficients do not meet the energy compactness expectations.

Before VLC coding is applied, the pattern to be coded may be tested and categorized into one of the three pattern types above. The algorithm may have four ways to entropy encoding, for example. Each way may be optimized for one of four cases listed above. The algorithm may try out all four ways to do encoding and choosing the best one (the one produces least bits). A pattern id number (e.g., 1 . . . 4) may be assigned to each pattern. The pattern id may be coded (e.g., as 2 bits) at the beginning of the bit stream, for example. For the first 3 pattern types, a quantity "rho" is defined as the number of items (coefficients) with a larger value than the defined data range (e.g., item>4 or item<−4 for pattern (3)). For example, a pattern classified as pattern id 2 may have 6 out of 16 coefficients with values outside the range of [−1, 1] (i.e., rho=6). As another example a pattern classified as pattern id 3 may have 7 out of 16 coefficients with values outside the range of [−4, 4] (i.e., rho=7). Rho may be coded first, then the coefficients outside the range may be coded. Rho may be coded using one VLC table and the coefficients outside the range may be coded using different VLC table. For example, coefficients outside the range may be coded using an AC table which covers data in the range of [−511, 511] shown in VLC Table 4 below. Coefficients that are within the range may be code coded using another AC table. For example, for a pattern classified as pattern id 2, coefficients having values within the range of [−1, 1] may be coded using VLC Table 2 below. As another example, for a pattern classified as pattern id 3, coefficients having values within the range of [−4, 4] may be coded using VLC Table 2 below. For pattern (1), the trailing 0s do not need to be coded. All the coefficients are coded using VLC Table 4 below.

VLC TABLE 2

| Abs(AC) | VLC code range: [−1, 1] |
|---|---|
| 0 | 0 |
| 1 | 1s |

VLC TABLE 3

| Abs(AC) | VLC code range: [−4, 4] |
|---|---|
| 0 | 00 |
| 1 | 1s |
| 2 | 010s |
| 3-4 | 011xs |

VLC TABLE 4

| Abs(AC) | VLC code range: [−511, 511] |
|---|---|
| 0 | 000 |
| 1 | 001s |
| 2-5 | 01xxs |
| 6-9 | 100xxs |
| 10-17 | 101xxxs |
| 18-33 | 110xxxxs |
| 34-65 | 1110xxxxxs |
| 66-129 | 11110xxxxxxs |
| 130-511 | 11111xxxxxxxxs |

VLC TABLE 5

| Rho | VLC code range: [0, 15] |
|---|---|
| 0-1 | 0x |
| 2-3 | 10x (18) |
| 4-7 | 110xx |
| 8-15 | 111xxx |

In summary, the example VLC coding technique may flow as follows. The DC differences for each block are coded using VLC table 1. The pattern is tested and an AC pattern id is coded in 2 bits. Next, the AC values are coded. For patterns ids (1)-(3), rho is coded first using VLC Table 5. Next, AC coefficients having values greater than the defined pattern range are coded using VLC Table 4. AC coefficients within the range are coded with either VLC Tables 2 or 3 depending on the pattern type. For pattern type (4), AC items are coded one after the other by using VLC Table 4.

After coding, the image data may be analyzed against the bit rate constraint to determine if the bit rate constraint is met.

If it is, then there may be room for quantization bits. However, if the bit rate constraint is not met, then the image data may be processed using a second coding scheme. For example, in one embodiment, layered coding is applied to the image data as described below.

Generally, the data space may be divided into a number of layers, and each layer may be progressively coded according to a pre-defined priority order. Additionally, as described in more detail below, a layering scheme can also be used for coding quantization errors to fill the available spaces during a non-progressive coding process to improve the visual quality of the reconstructed image. In one embodiment, a layered coding approach divides the data space into several layers with various priorities and then progressively codes each data layer following the priority order. The scalability characteristics of this approach make it capable to satisfy the rate constraints.

Figures 5A, 5B:
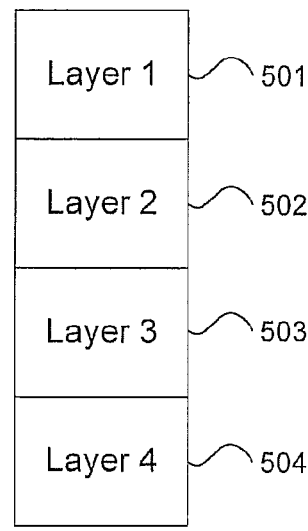
FIGS. 5A-B illustrate layered coding.

FIGS. 5A-B illustrate a layered coding method according to one embodiment of the present invention. FIG. 5A illustrates that layers may be assigned different priorities. For example, layer 1 501 may be assigned the highest priority, layer 2 502 may be assigned the next highest priority, layer 3 503 may be assigned a priority following layer 2, and in this example layer 4 504 may be assigned the lowest priority. As illustrated in FIG. 5B, coefficients in the 4×4 matrix 500 can be associated with different layers. For instance, the DC coefficient in the uppermost and leftmost position may be associated with layer 0, and accordingly, may be coded with a high priority. In this example, coefficients positioned closer to the DC coefficient (e.g., coefficients positioned along the top and left edges of the matrix) are associated with a higher priority than coefficients positioned on the lowermost and rightmost position of the matrix. For example, coefficient generated by the transformation process that have higher energies may be assigned higher priorities. In this example, coefficients in the second row and second column (excluding the edges) are associated with layer 2, and coefficients in the third row and third column (excluding the coefficients associated with layers 1 and 2) are associated with layer 3. In this example, the lower right coefficient is associated with layer 4.

FIG. 6 illustrates an example layered coding method according to another embodiment of the present invention. As shown in FIG. 6 in each block the data coefficients are classified into different layers (e.g., Layer 1—L1; Layer 2—L2; Layer 3—L3; Layer 4—L4). Each coefficient in this example is divided into 2 parts: significant bits ("S") and lower bits ("L", e.g., the lowest 3 bits). Therefore, the 16 coefficients may be divided into 5 layers:

Layer 0: DC value (C0);
Layer 1: Significant bits of the first 6 AC coefficients (C1-C6 S-bits: 6-bit signed data);
Layer 2: Lower bits of the first 6 AC coefficients (C1-C6 L-bits: 3-bit unsigned data);
Layer 3: Significant bits of the last 9 AC coefficients (C7-C15 S-bits: 7-bit signed data); and
Layer 4: Lower bits of the first 9 AC coefficients (C7-C15 L-bits: 3-bit unsigned data).

Additionally, in one embodiment, the 8 blocks resulting from the transformation of A0, Y0, U0, V0, A1, Y1, U1, and V1 are coded in an interleaved manner. For example, the coefficients associated with layer 0 in each block may be coded first. The coefficients in each block associated with layer 1 may be coded after the layer 0 coefficients. The remaining coefficients may be processed in accordance with prioritization of both the layers and block attributes (e.g., transparency and luminance before chrominance). As a specific example, the coefficients may be coded in the following order:

1. A0 Layer 0, A1 Layer 0, Y0 Layer 0, Y1 Layer 0, U0 Layer 0, V0 Layer 0, U1 Layer 0, V1 Layer 0
2. A0 Layer 1, A1 Layer 1, Y0 Layer 1, Y1 Layer 1, U0 Layer 1, V0 Layer 1, U1 Layer 1, V1 Layer 1
3. A0 Layer 2, A1 Layer 2, Y0 Layer 2, Y1 Layer 2
4. A0 Layer 3, A1 Layer 3, Y0 Layer 3, Y1 Layer 3
5. U0 Layer 2, V0 Layer 2, U1 Layer 2, V1 Layer 2
6. A0 Layer 4, A1 Layer 4, Y0 Layer 4, Y1 Layer 4
7. U0 Layer 3, V0 Layer 3, U1 Layer 3, V1 Layer 3
8. U0 Layer 4, V0 Layer 4, U1 Layer 4, V1 Layer 4

The coding may be terminated at the moment that the bit budget has been reached, for example. If the remaining data causes the bit budget to be exceeded, the code is truncated to leave the first part of the code in the stream.

In one embodiment, a number of VLC tables are used to code different layers of coefficients. The data in layer 0 (e.g., DC) may be coded VLC Table 1, the data in layers 1 and layer 3 may be coded with VLC Table 6 if assigned QP=2 or coded with VLC Table 7 if QP=4, and the data in layers 2 and 4 may be coded with VLC Table 8 if its corresponding significant bits, S, are not 0, and otherwise layers 2 and 4 are coded with VLC Table 9.

VLC TABLE 6

| Abs(AC S-bits) | VLC code range: [−15, 15] |
| --- | --- |
| 0 | 0 |
| 1 | 10s |
| 2-3 | 110xs |
| 4-7 | 1110xxs |
| 8-15 | 1111xxxs |

VLC TABLE 7

| Abs(AC S-bits) | VLC code range: [−7, 7] |
| --- | --- |
| 0 | 0 |
| 1 | 10s |
| 2-3 | 110xs |
| 4-7 | 111xxs |

VLC TABLE 8

| AC L-bits | VLC code range: [0, 7] |
| --- | --- |
| 2-3 | 0x |
| 1, 4 | 10x |
| 0, 5, 6, 7 | 11xx |

VLC TABLE 9

| Abs(AC L-bits) | VLC code range: [−7, 7] |
| --- | --- |
| 0 | 00 |
| 1 | 01s |
| 2-3 | 10xs |
| 4-7 | 11xxs |

In one example embodiment, the layering technique described above is only be used when the result of the initial VLC coding exceeds the pre-assigned bit budget.

Figure 7:
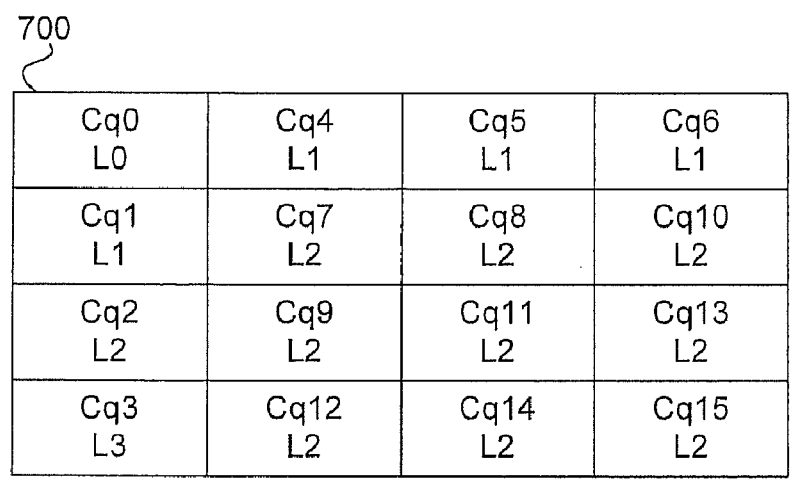
FIG. 7 illustrates another example of layered coding applied to quantization data.

As mentioned above, a layering scheme can also be used for coding quantization errors to fill the available spaces if the bit rate constraint is satisfied after the initial coding. For example, in order to increase the coding efficiency, the quantization errors are coded to fill the gap in case the resultant bit stream does not use up a whole burst. Specifically, for the 8 4×4 blocks, if the merged 8 bit streams use 1.1 bursts (e.g., 35 bytes), the quantization error data may be used to fill the unused 0.9 bursts (e.g., 29 bytes) and improve the quality. As shown in FIG. 7, the coefficient quantization errors, Cq0 . . . Cq15, in a block are classified into 3 layers (L0, L1, and L2). The coefficient quantization errors may then be indexed with priorities (e.g., Cq0 is the most important and Cq15 is the least important) and layer 0 may not be coded. For scheme A and B, the 8 blocks are mapped to AYUV format as mentioned above. Thus the errors are reorganized based on the priority order as follows:

1. A0 Layer 1, A1 Layer 1, Y0 Layer 1, Y1 Layer 1, U0 Layer 1, V0 Layer 1, U1 Layer 1, V1 Layer 1; and
2. A0 Layer 2, A1 Layer 2, Y0 Layer 2, Y1 Layer 2, U0 Layer 2, V0 Layer 2, U1 Layer 2, V1 Layer 2

The errors are coded following the above order until the bit budget is used up (e.g., even for the case partial code is appended at the end). If there are empty slots available at the end, 0s may be inserted as pads to fill up the burst.

VLC TABLE 10

| Abs(Q Error) | VLC code range: [−1, 1] |
|---|---|
| 0 | 0 (19a) |
| 1 | 1s |

VLC TABLE 11

| Abs(Q Error) | VLC code range: [−3, 3] |
|---|---|
| 0 | 00 |
| 1 | 1s (19b) |
| 2-3 | 01xs |

VLC TABLE 12

| Abs(Q Error) | VLC code range: [−7, 7] |
|---|---|
| 0 | 00 |
| 1 | 01s (19c) |
| 2-3 | 10xs |
| 4-7 | 11xxs |

VLC TABLE 13

| Quant Error | VLC code range: [0, 1] |
|---|---|
| 0 | 0 |
| 1 | 1 (20) |

VLC TABLE 14

| Quant Error | VLC code range: [0, 2] |
|---|---|
| 1 | 0 |
| 0 | 10 (21) |
| 2 | 11 |

VLC TABLE 15

| Quant Error | VLC code range: [0, 7] |
|---|---|
| 2-3 | 0x |
| 1, 4 | 10x |
| 0, 5, 6, 7 | 11xx (21a) |

In one embodiment, the quantization error is coded as follows. When Cq=0, the error for the $1^{st}$ to $6^{th}$ AC coefficients is in the range of [−(QP−1), QP−1]. Therefore, VLC Table 10 is used when QP=2, and VLC Table 11 is used when QP=4. When Cq=0, the error for the $7^{th}$ to $15^{th}$ AC coefficients is in the range of [−(2QP−1), 2QP−1]. Therefore, VLC Table 11 is used when QP=2, and VLC Table 12 is used when QP=4. When Cq≠0, the error for the $1^{st}$ to $6^{th}$ AC coefficients is in the range of [0, QP−1]. Therefore, VLC Table 13 is used when QP=2, and VLC Table 14 is used when QP=4. In this example VLC Table 14 may only consider the range [0, 2] instead of [0, 3]. The reduced range of 2 may be used to replace the range of 3 in coding to save bits at the cost of some insignificant errors. When Cq≠0, the error for the $7^{th}$ to $15^{th}$ AC coefficients is in the range of [0, 2QP−1]. Therefore, VLC Table 14 is used when QP=2, and VLC Table 15 is used when QP=4.

In one embodiment, for schemes A, B, and C from Table 1, the coded bit stream is output using a DDR burst size (32B) as the minimum data unit. The pre-defined QP and the upper bound compression ratio determine together the number of DDR bursts of the coded bitstream. There are 3 ways that the coding process may finish the coding tasks. First, all the coefficients (and quantization errors) are coded, and there are still a number of empty slots available for the burst. In this scenario, the algorithm pad 0s at the end. Second, during coding, the bit budget (e.g., the boundary of the DDR burst) is reached, and the coded image data for the current data unit fills the budget. In this scenario, the algorithm terminates after putting the current coded data unit into the burst. Third, during coding, the bit budget is reached, but the coded data of the current data unit causes the bit stream to cross the DDR burst boundary. In this scenario, part of the coded data unit is appended in the bit stream to fill up the DDR burst, while the rest is discarded. Accordingly, in the decoder side, the decoding process terminates for the following 3 conditions. First, all the coefficients (and quantization errors) are decoded. Second, the bit budget is used up and part of the coefficients (or quantization errors) are decoded. The last coded data unit is decoded exactly at the boundary. Third, the bit budget is used up and part of the coefficients (or quantization errors) are decoded. The last codeword before the boundary is not decodable. For scheme D, the memory access is based on the linear access pattern, so the boundary between DDR bursts can be ignored. In other words, it is fine to have coded data unit across the DDR burst boundary, since it is the decoder's responsibility to recover the coded data that across the boundary.

Example Applications

The above described techniques may be applied to a variety of image coding applications. In one embodiment, the following implementation specific rules can be applied. For scheme A and B, if the compression ratio=0 is detected (by transparency and z-order detection), the compression is automatically by-passed, and the compression attributes are recorded to cache accordingly. In one embodiment, all the data units are converted into 4×4 data inputs for processing. For example, for scheme A, the 8×4 ARGB pixels are reorganized into 8 4×4 blocks, and the coding process is constrained by QP and compression ratio upper bound (thus layer coding may be needed for some cases). For scheme B, the 16×4 YUV 4:2:2 pixels are reorganized into 8 4×4 blocks, and the coding process is constrained by QP and compression ratio upper bound (thus layer coding may be needed for some cases). For scheme C, the 32×4 Luma/Chroma are reorganized into 8 4×4 blocks, and the lossless coding is handled without any constraint (thus no layered coding is needed). For scheme D, the 16×1 YUV 4:2:2 are reorganized into 2 4×4 blocks for compression, which is constrained by QP but not by any bit budget (thus no layered coding is needed). The 4-bit motion information may be coded using a differential coding method between neighboring blocks (the initial motion value is set to be 0) and the VLC Table 16 listed below is used. In scheme D, for each input data unit, the motion information may be coded and stored before the video data.

VLC TABLE 16

| Abs(Motion) | VLC code range: [−16, 16] |
|---|---|
| 0 | 000 |
| 1-2 | 1xs |
| 3-4 | 010xs |
| 5-8 | 001xxs |
| 9-16 | 011xxxs |

In some applications, for schemes A, B and C, if the resultant bit stream size is greater than 96B (or the compression ratio>3/4), then the original data is output without compression. The reason is that such compression (ratio>3/4) does not help to reduce the DDR bursts, hence it is desirable to cancel this operation to make the decoding process easier. The output in this example is 2 kinds of data: (1) The resultant coded bit stream; and (2) The coded 4-bit or 2-bit compression attribute for decoding purposes.

Example Data Decompression

The decompression process is a reverse of the compression process used. For example, the following steps may be required to obtain the reconstructed data from the detailed implementation examples above. For schemes A, B, and C, the compression attributes are first decoded to get compression ratio, QP information, and the compression algorithm that is used. If compression ratio=0, return random data with transparent alpha value, and if compression ratio=1, return the uncompressed data from the bit stream. Otherwise, execute the following steps. For scheme D, decode the motion information first before decoding the video data. For all schemes, decode the coded DC and AC coefficients with various VLC tables. In schemes A and B, for cases without using a layered coding algorithm for coding coefficients, if more bits in the stream are available, then decode these data with the VLC tables to obtain quantization errors. Necessary data reorganizations are conducted if layered coding is used. After all the coefficients (and quantization errors) are obtained, conduct de-quantization (and compensation if quantization error is available), inverse-scan, inverse-transform, and color space conversion, if necessary to complete the decompression task.

Example System Architecture

Figure 8:
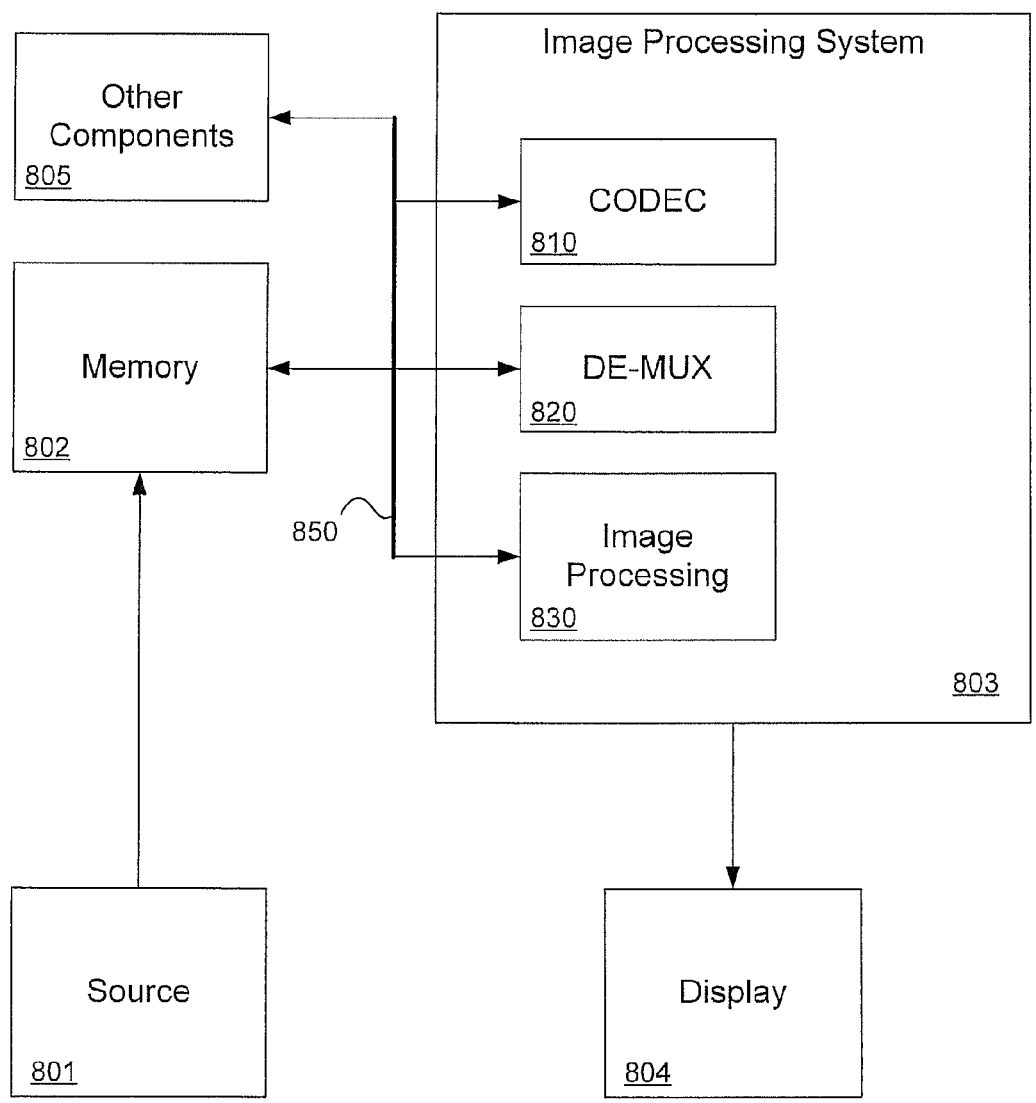
FIG. 8 illustrates an image processing system according to an embodiment of the present invention.

FIG. 8 is an example image processing architecture that may implement embodiments of the present invention. Image processing system 800 includes a source 801 of image data. Source 801 may be a video source or still image source, for example. Example sources include DVD players, Broadcast TV systems, such as receivers (e.g., set top cable boxes), or network video streaming systems, such as an Internet Protocol ("IP") video streaming system (e.g., IP TV set top box). The image data source 801 may store the image data in memory 802, for example. Memory 802 may be a high speed dynamic random access memory ("DRAM"), such as a double data rate ("DDR") memory, for example. The image data received from source 801 may be compressed or otherwise coded according to a standard. For example, the image data may be received as H.264, VC1, MPEG2, or MPEG4, to name just a few standards. Memory 802 is coupled to an image processing system 803. Image processing system 803 may be an integrated circuit ("IC"), such as a system-on-a-chip IC for performing a variety of image processing functions. System 803 can include, for example, a coder-decoder ("CODEC") 810, DE-MUX 820, and image processing block 830. CODEC 810 may receive image data from memory 802 and decode the image data by applying a decoding algorithm corresponding to the particular standard used to code the image data. The decoded data may be stored in memory 802 for further processing, for example. DE-MUX 820 may receive image data from memory 803 and separate the audio data from the image data, for example. DE-MUX 820 may store the result back in memory 802 for further processing, for example. Image processing block 830 may receive decoded and separated image data and perform post processing to display the image data on a display 804, such as a television or computer display (e.g., an LCD system). For example, an image processing integrated circuit may include output pins for producing an output bit stream to a display.

Image data is transferred between memory 802 and image processing system 803 using one or more signal lines 850. The one or more signal lines may be coupled to one or more pins of an image processor integrated circuit, for example. Signal lines 850 may comprise a data bus, for example. Different memory architectures may provide for a single shared bus or multiple distinct signal lines (ports) for accessing information in the memory. Additionally, source 801 and other components 805 (e.g., a CPU) may compete for use of the bus. Given the large amounts of image data flowing between memory 802 and image processing system 803, limited bandwidth of the signal lines between memory 802 and image processing system 803 can constrain the ability of the system to process image data at the rate required for proper display to a user. In one embodiment, the present invention includes lowering the bandwidth required to transfer image data between memory 802 and image processing system 803 and reduce the amount of memory used to store image data at intermediate steps in an image processing procedure. One feature of the present invention includes receiving the image data in image processing system 803 coded using a first image coding process (e.g., a standard such as H.264, VC1, MPEG2, or MPEG4), decoding the image data on the image processing system 803 (e.g., in CODEC 810), coding the decoded image data using a second image coding process (e.g., using one or more of the innovative coding techniques described above), and transmitted the coded image data across the signal lines (e.g., a memory bus or port) to store the coded image data in memory 802 for further processing. Accordingly, valuable memory space is conserved and the bus bandwidth is reduced, improving the throughput of the system. This process is referred to herein as memory traffic reduction ("MTR").

Example Implementation of MTR

Figure 9:
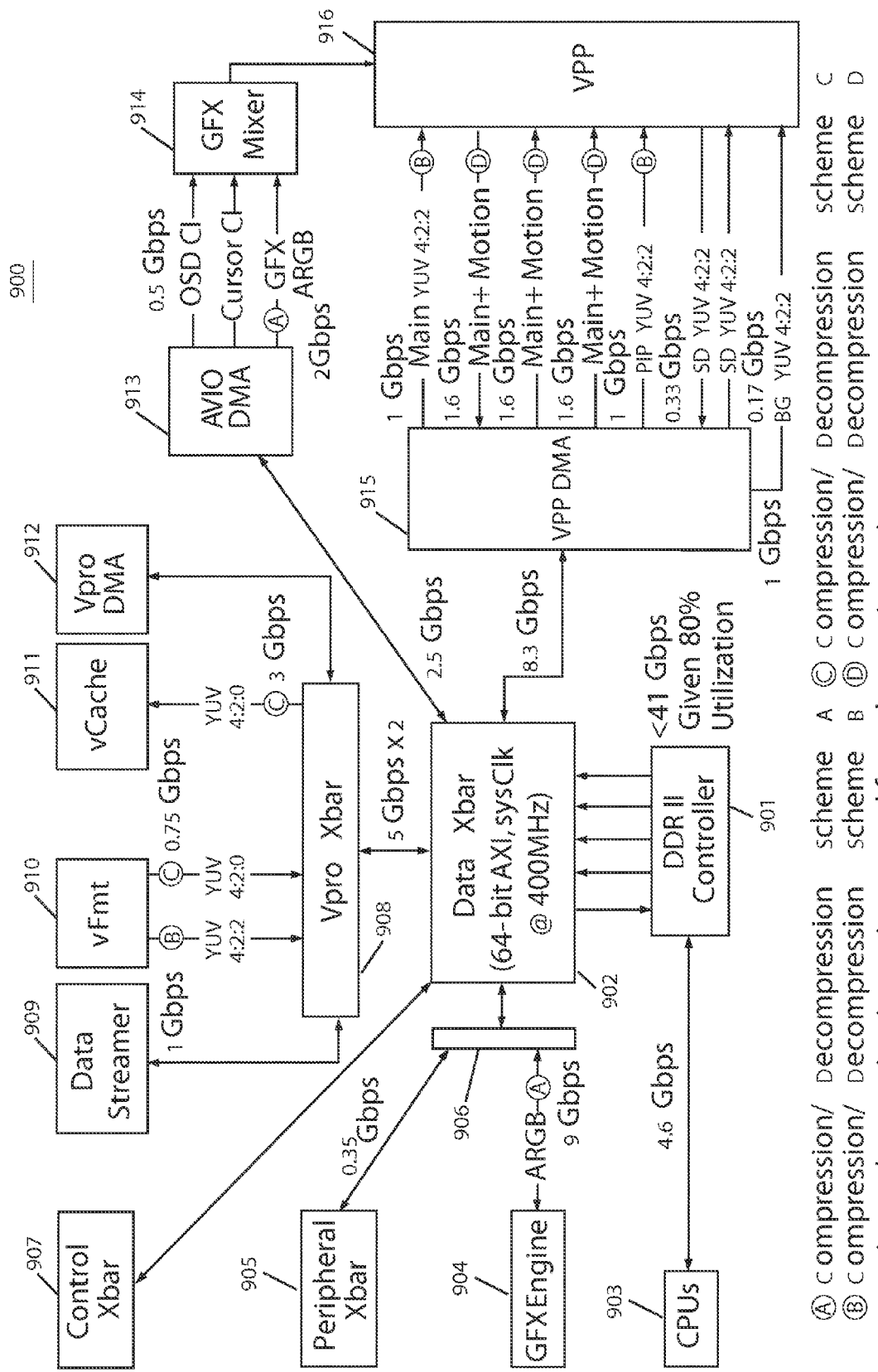
FIG. 9 illustrates an example implementation of an image processing system according to an embodiment of the present invention.

FIG. 9 illustrates an MTR architecture according to one embodiment of the present invention. The bandwidth information in FIG. 9 refers to the status before the compression/decompression has been conducted. MTR system 900 may reduce the system memory bandwidth. MTR system 900 may provide lossy or lossless compressions on data used by graphics and video related functional modules. Additionally, system 900 may analyze the z-order and transparency characteristics of the data planes to avoid non-necessary DDR access. Further, system 900 may use cache mechanisms to reduce DDR access frequency.

In FIG. 9, a DDR-related system block diagram with MTR equipped is shown. In the figure, there are 5 AXI modules that consume DDR 901 via the data Xbar 902, namely, GFX 904, Peripheral 905, VPro 908, AVIO 913, VPP 916, and CPU 903 directly accessing DDR 901. MTR 900 works on the visual data compression/decompression to reduce memory bandwidth, however, due to the variety of data formats for different masters, there are 4 major MTR variants (as shown in FIG. 9) deployed in the system. They are as follows:

1. MTR handling data generated by graphics engine 904, or scheme A shown in FIG. 9. The data are in the 32-bit ARGB format (if in 8-bit indexed color, the MTR is turned off), and the pixels are lossy or lossless compressed, sent to DDR 901, and stored in tiled structure with each tile representing 8×4 pixels.
2. MTR handling YUV 4:2:2 video data generated by the video decoder, or scheme B shown in FIG. 9. The data are in the 16-bit YUV 4:2:2 format (e.g., UYVY), and the pixels are lossy or lossless compressed, sent to DDR 901, and stored in tiled structure with each tile representing 16×4 pixels.
3. MTR handling the reference pixels for the video decoder, or scheme C shown in FIG. 9. The data are in the 12-bit YUV 4:2:0 format, and the pixels are lossless compressed, sent to DDR 901, and stored in tiled structure with each tile representing 32×4 pixels.
4. MTR handling the data used by VPP 916 for 3D de-interlacing with the format of 20-bit YC (16-bit)+motion (4-bit) (if the 3D NR is supported, the format is 26-bit with YC (22-bit)+motion (4-bit)). The data are lossy or lossless compressed and stored in DDR 901 in linear structure.

In addition, there is a z-order/transparency filter (not shown in the figure) in the compressor/decompressor to help remove the unnecessary DDR access by background plane by detecting if the current background block in processing is a z-depth hidden-block in the PIP/Main video/background stack or if the graphics block is transparent. It is required that for every frame CPU 903 programs the main video position and the PIP position and global alpha value into the compressor/decompressor with z-order filter deployed.

MTR Functions and Modes

MTR system 900 provides a flexible configuration scheme for users to specify the quality and compression rate expectations by providing:

1. Picture quantizer parameter (QP); and
2. Upper bound compression ratio (for example, 1/2 or 1/4).

The QP is used for compressing each data unit inside a frame as described above. Using a unique QP guarantees a constant visual quality across the coded picture. Selection of appropriate quantizers for continuous frames is performed via software to guarantee constant quality across a video sequence. In case the assigned QP is not sufficient to achieve the upper bound compression ratio, an alternative compression algorithm may be used (e.g., layer coding) to guarantee the upper bound ratio to be satisfied.

In the MTR system 900, two set of compression algorithms may be used. A primary algorithm may quantize the frequency coefficients after transform during the compression process. A secondary algorithm may down-scale or convert the color space to meet a tight bit rate constraint. Mixing the use of the different algorithms in the picture compression (for different blocks) may result in degradations in the pictures constant quality effect.

MTR system 900 supports the following functions and modes:

1. Lossy compression/Decompression with various rates (determined by the QP and upper bound ratio selection);
2. Lossless compression/decompression; and
3. By-pass mode (no compression).

Using a compression attribute to store the coding parameters (such as compression ratio, QP and z-order/transparency information) for each tile, for example, it is feasible for software to let MTR system 900 handle data in different address spaces with different coding mode settings. On the other hand, MTR system 900 may focus on bandwidth saving, but may not include buffer space saving. The uncompressed memory structure may be unprocessed, and the MTR system 900 may store the compressed data into a portion of the buffer space.

Design Constraints and Limitations

In the MTR design, there are a number of constraints or limitations that have been taken into account:

1. DDR access efficiency: Since every DDR burst read and write contains 32 bytes, we require the size of the basic unit for compressed data to be 32 bytes.
2. Extra on-chip memory buffer cost: Depending on the compression scheme, some extra buffers may be required on the consumer side of the lossy/lossless decoder, for example, line buffers may be used at the decompressor side for reducing unnecessary memory access.
3. Visual quality degradation caused by lossy compression: There are a number of common visual quality degradation issues that we should take into account in our lossy compression algorithm design:
    Blockiness/ringing artifacts due to the lossy quantization on frequency coefficients
    Blurriness artifacts for wavelet-based compressions
    "Jaggies" artifacts caused by scaling
    Chroma upsampling error
    Object shape boundary error due to lossy alpha channel Data and Memory Structure In one embodiment, two types of memory structures are used. For example, embodiments of the MTR system may use a linear memory structure and tile-based memory structure, for example. The structure for compressed and uncompressed data is also described below.

Linear Memory Structure for Uncompressed Data

Most of the uncompressed data (except the reference video data) are stored in linear memory structure format, although the memory access may occur in tiled structure. FIG. 10 illustrates various cache lines in a memory without compression, where each cell is a pel, each section represents one cache line, and S is the frame width in pixel. As shown in FIG. 10, the memory structure for the graphics engine 904 is organized line by line (assuming S is the frame width in pixel). Graphics engine 904 may output pixels in 32-bit ARGB data format, and its memory access is based on cache line basis, that is, each cache line read consists of 8×8 pixels (8×1 pixels per transaction), which is 8 32 bytes, and each write consists of 8×2n pixels. In FIG. 9, the pixels (each cell) in each cache line (the cells in sections 1001 (rows 0-7, cols. 0-7), 1002 (row 8, cols. 0-7), 1003 (rows 0-7, cols. 8-15), 1004 (row 8, cols. 8-16), and 1005 (rows 0-8, col. 16)) are not in continuous addresses, but in 8 chunks of continuous addresses, and each pixel corresponds to 4 bytes.

Similarly, the decoded video output for display is stored in linear structure. It is quite similar to the format mentioned FIG. 10 except for three differences:
1. The basic data unit is 16×4 pixels;
2. Each pixel corresponds to 2 bytes;
3. video frame could be in progressive format or interlaced format, while graphic frame is in progressive format.

Linear Memory Structure for Compressed Data

As mentioned above, MTR system 900 may not change the frame buffer structure to reduce buffer size. FIG. 11 illustrates cache lines in a memory after compression for a compression ratio of 1/4 for the left cache line, 5/8 for the right cache line, where each cell is a pel, each section (e.g., sections 1101 (rows 0-7, cols. 0-7), 1102 (row 8, cols. 0-7), 1103 (rows 0-7, cols. 8-15), 1104 (row 8, cols. 8-16), and 1105 (rows 0-8, col. 16)) represent one cache line, and S is the frame width in pixel. The decoded video output for display is compressed with 5 possible ratios, given 16×4 pixel (128B) is the uncompressed unit, and 32B is the compressed data unit. As shown in FIG. 11, the compressed data are stored at the beginning of each data unit (in the figure it is 8×8 pixel for each unit) and the remaining portion of the data unit is left unused. For the compressed data, the minimum data unit is 32 bytes. Therefore there are 9 possible compression ratios in this example, that is, 0, 1/8, 2/8, 3/8, 4/8, 5/8, 6/8, 7/8, 8/8.

Tile-Based Memory Structure for Uncompressed Data

FIG. 12 illustrates a tile based memory structure used for storing reference video frames, where the Y and UV data are stored in separate locations and each tile (e.g., tiles 1201-1204) represents 8×4 pixels (e.g., with an 8-bit intensity value). In FIG. 12, a DRAM page may contain 32×32 pixels (or 1K bytes), and these pixels are partitioned into 32 8×4 tiles. The difference between tile-based memory structure and linear memory structure is that all the pixels in one unit (where a unit refers to a tile or cache line) have been stored in continuous memory addresses in the tile-based structure.

Tile-Based Memory Structure for Compressed Data

The tile-based memory structure may be used for memory compression. FIGS. 13A-B illustrate a compression scheme for a tile-based memory structure. By coupling neighboring tiles, consecutive tiles can be compressed into one depending on the compression ratio. For example, in FIGS. 13A-B, adjacent tiles (e.g., tiles (0,0) and (0,2), tiles (0,2) and (0,3) through tiles (7,2) and (7,3)) are coupled. Considering that one purpose of the memory compression is for memory bandwidth saving instead of reducing the frame buffer, the proposed scheme makes the memory address mapping very straightforward. FIG. 13A illustrates tile coupling for compression (adjacent tiles are coupled as mentioned above) and FIG. 13B illustrates compressed couple tiles. As shown in FIGS. 13A-B, an example of 1/2 compression ratio is demonstrated, where the consecutive 2 adjacent tiles are coupled for compression, and the results data are stored in the slot of the first tile.

MTR Schemes

As mentioned in the section above, there may be 4 kinds of MTR variants with different data process patterns, but they have the following common properties:
1. One target of MTR system 900 may include saving memory bandwidth, while not reducing the frame buffer size. Hence the address relationship between the neighboring data units may be the same whether or not compression is conducted. This way, the address calculation for data access is simplified;
2. A shared L2 cache may be used for the MTR variant for reducing DDR access frequency;
3. A shared attribute cache may be used to hold a coding mode (e.g., compression attribute), and each mode may be represented by 4-bit or 2-bit;
4. The lossy compression may be conducted with an assigned quantizer (QP) from the software. The quantizer may be unique for a whole picture to guarantee an overall constant visual quality. When QP=1, lossless compression is conduced. However, if the software sets the upper bound compression ratio to a value that the assigned QP cannot reach, other compression methods (e.g., layering) are used to guarantee the desirable compression ratio.

MTR Scheme A

Figure 14:
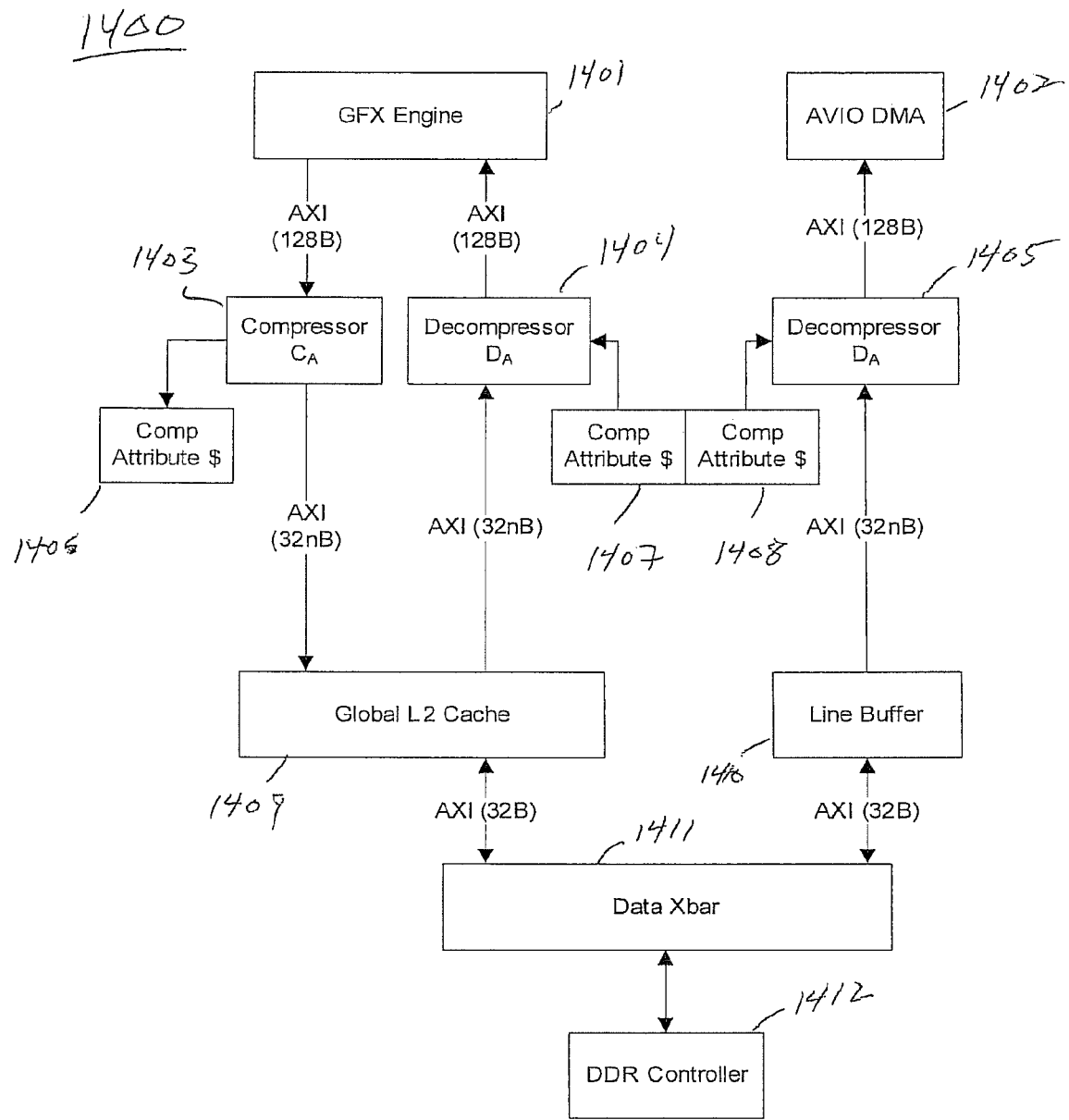
FIG. 14 is a block diagram of an image processing scheme according to an embodiment of the present invention.

FIG. 14 illustrates MTR scheme A 1400. As shown in FIG. 14, there are three major data paths:
1. The graphics engine 1401 writes data to DDR 1412 in the compressed format;
2. The graphics engine 1401 reads data from DDR 1412 and conducts decompression; and
3. The AVIO DMA 1402 drains graphics plane from DDR 1412 and decompresses the data for a graphics mixer.

In FIG. 14 there are 5 MTR related modules, including compressor 1403, decompressor 1404, compression attribute engine illustrated at 1406-1408, L2 cache 1409, and line buffer 1410. The inputs of compressor 1403 may be fixed 8×4 pixel data unit (128B), and the output and the compression ratio is determined by QP and the upper bound ratio. Decompressor 1404 may be the reversed process module of compressor 1403, having an input of 32nB (n=0, 1, 2, 3, 4) of compressed data, and an output of 8×4 pixels. Compression attribute engine illustrated at 1406-1408 fetches or stores attribute information to the attribute cache. A 4-bit attribute is used to represent the value of n, QP, and transparency information, which reflects the compression ratio. In the compression/decompression process, the compressor 1403 determines n and stores it for decompressor 1404 to fetch n bursts in the future for decoding. L2 cache is used to reduce the DDR access from the graphics engine. Line buffer 1410 may be used in the graphics data path to AVIO DMA 1402 for a graphics mixer (e.g., 914 in FIG. 9). Line buffer 1410 may store up to 4 lines, for example, of uncompressed data depending on the compression ratio.

The cache system (e.g., either attribute cache or L2 cache) may be implemented using a variety of techniques, which may be included in an SoC subsystem based on the overall system requirements. There are 5 kinds of buffers corresponding to graphics operations:
1. Graphics object buffer: 32-bit ARGB, MTR applies;
2. OSD rendering buffer: 8 bits/pixel, so no need for MTR;
3. PG rendering buffer: 8 bits/pixel, so no need for MTR;
4. Double buffer for IG/PG merging: 32-bit ARGB, MTR applies;
5. Double buffer for mixing graphics to display (OSD & graphics merging): 32-bit ARGB, MTR applies.

OSD and PG buffer may consume 8 bits/pixel and may rely on the assumption that the graphics engine or SPU engine supports 8-bit LUT (color index) output. Otherwise, MTR applies to them.

MTR Scheme B

Figure 15:
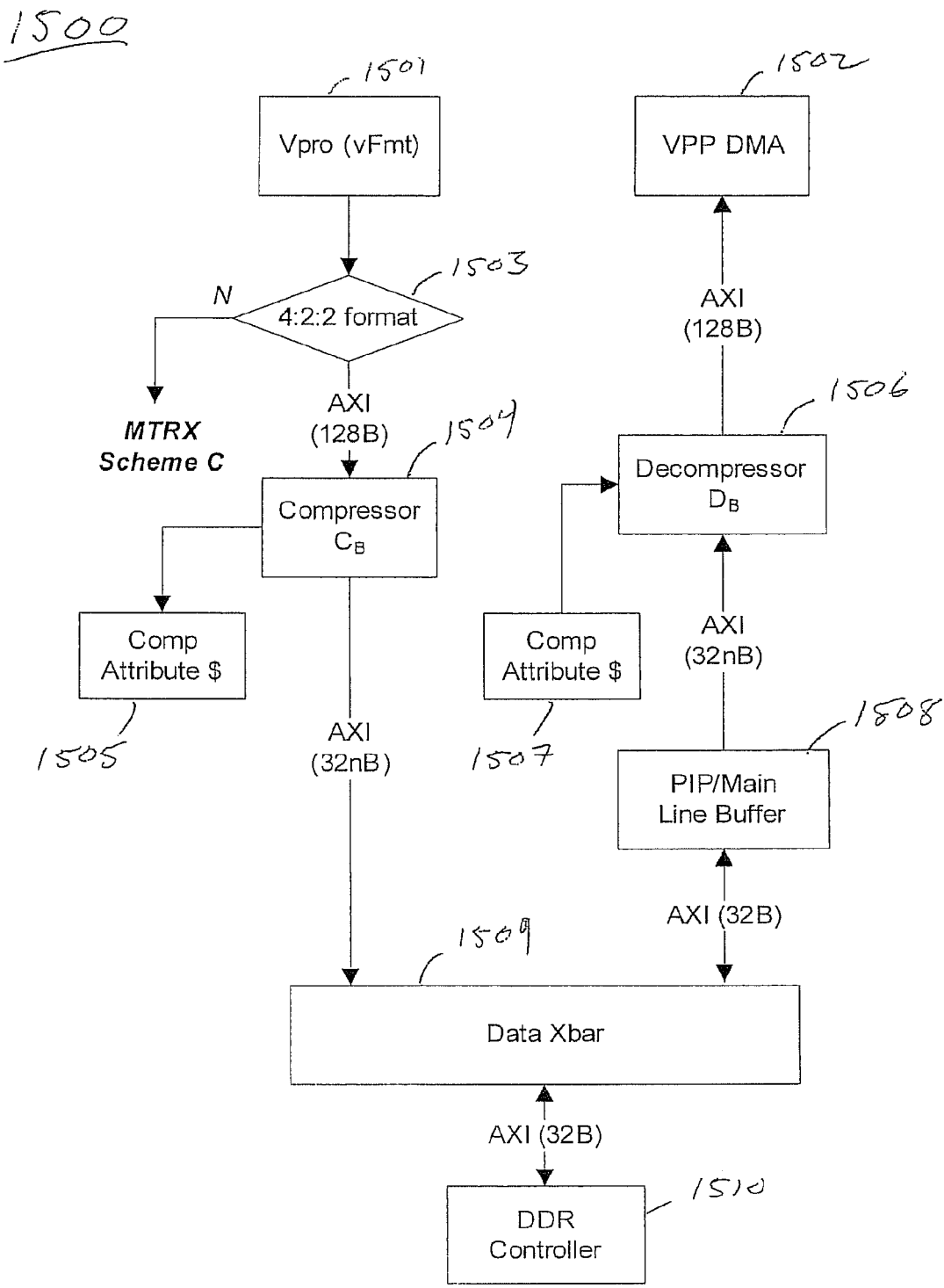
FIG. 15 is a block diagram of another image processing scheme according to an embodiment of the present invention.

As shown in FIG. 15, the block diagram of MTR scheme B 1500 is demonstrated. There are two major data paths:

1. The VPro 4:2:2 output data is compressed and sent to DDR 901 in FIG. 9;
2. The VPP DMA 915 in FIG. 9 reads the video data from DDR 901 and decompresses the data;

In FIG. 15, there are 4 MTR related modules, including a compressor 1504, decompressor 1506, compression attribute engine illustrated at 1505 and 1507, and a PIP/Main Line Buffer 1508. The modules are described as follows:

1. Compressor 1504: the input is in a fixed 16×4 pixel data unit (128B) and each pixel is in 16-bit UYVY format, and the output and the compression ratio is determined by QP and the upper bound ratio.
2. Decompressor 1506: executes the reverse process of the compressor 1504, whose input is 32nB (n=1, 2, 3, 4) compressed data, and the output is 16×4 pixels;
3. Compression attribute engine 1505,1507: fetches or stores attribute information to the attribute cache. A 4-bit attribute is used to represent the value of n, QP, and z-order information, which directly reflect the compression ratio. In the compression/decompression process, the compressor 1504 determines n and stores it for decompressor 1506 to fetch n bursts in the future for decoding.
4. PIP/Main Line buffer 1508: used in the data path that the video data is loaded to VPP DMA 915 of FIG. 9 as line buffers for both main and PIP video. The line buffer needs to store up to 4 lines pixels in the uncompressed format for main and PIP video, respectively.

Although not shown in FIG. 15, there may be a z-order filter in the compressor/decompression to help remove the unnecessary DDR access by background plane by detecting if the current background block in processing is a z-depth hidden-block in the PIP/Main video/background stack. The filter requires the CPU to program the Main video position and the PIP position and global alpha value for every frame. There are only 6 possible scenarios from z-order filter point of view:

1. PIP block is visible only: which means only the PIP plane is available and shown, so the main video or background DDR access request can be bypassed;
2. Main video block is visible only: which means the PIP plane is transparent or not available in this block, so the PIP or background DDR access request can be bypassed;
3. Background is visible only: which mean the PIP is transparent or not available and the main video is not available in this block, so the main video and PIP DDR access request can be bypassed;
4. PIP and main video block are visible only: which means the PIP is not purely transparent, and thus the main video block is visible, so the background DDR access request can be bypassed;
5. PIP and background block are visible only: which means the main video block is not available, so the main video DDR access request can be bypassed; and
6. None is visible: in this case, all the DDR access requests can be bypassed.

In some applications, the invisible region of the main video may be written to DDR 901 of FIG. 9. For example, all the hidden area of the main video can be detected by the z-order filter to save the DDR access. However, all the main video data may contribute to the 3D deinterlacing of future frames, although it may not be useful for the current frame. In other words, if the future frame needs data from the unrecorded data block, this missing data may cause quality degradation of de-interlacing (unless the application allows 2-fields delay for the system to react to user's interaction, which allows the system to re-generate the correct motion information).

In some applications, it may be desirable to let the main video decoder write back all the data in the video frame, and use z-order filter to save the DDR access for the area that the main video window does not cover. In other words, even for the area that the main video window is not visible (hidden by an opaque PIP on top), it may be necessary to write back the related video data and perform de-interlacing to store the resultant video and motion for potential future usage. When the main video window does not cover the current block, the DDR access related to main video may be bypassed.

MTR Scheme C

Figure 16:
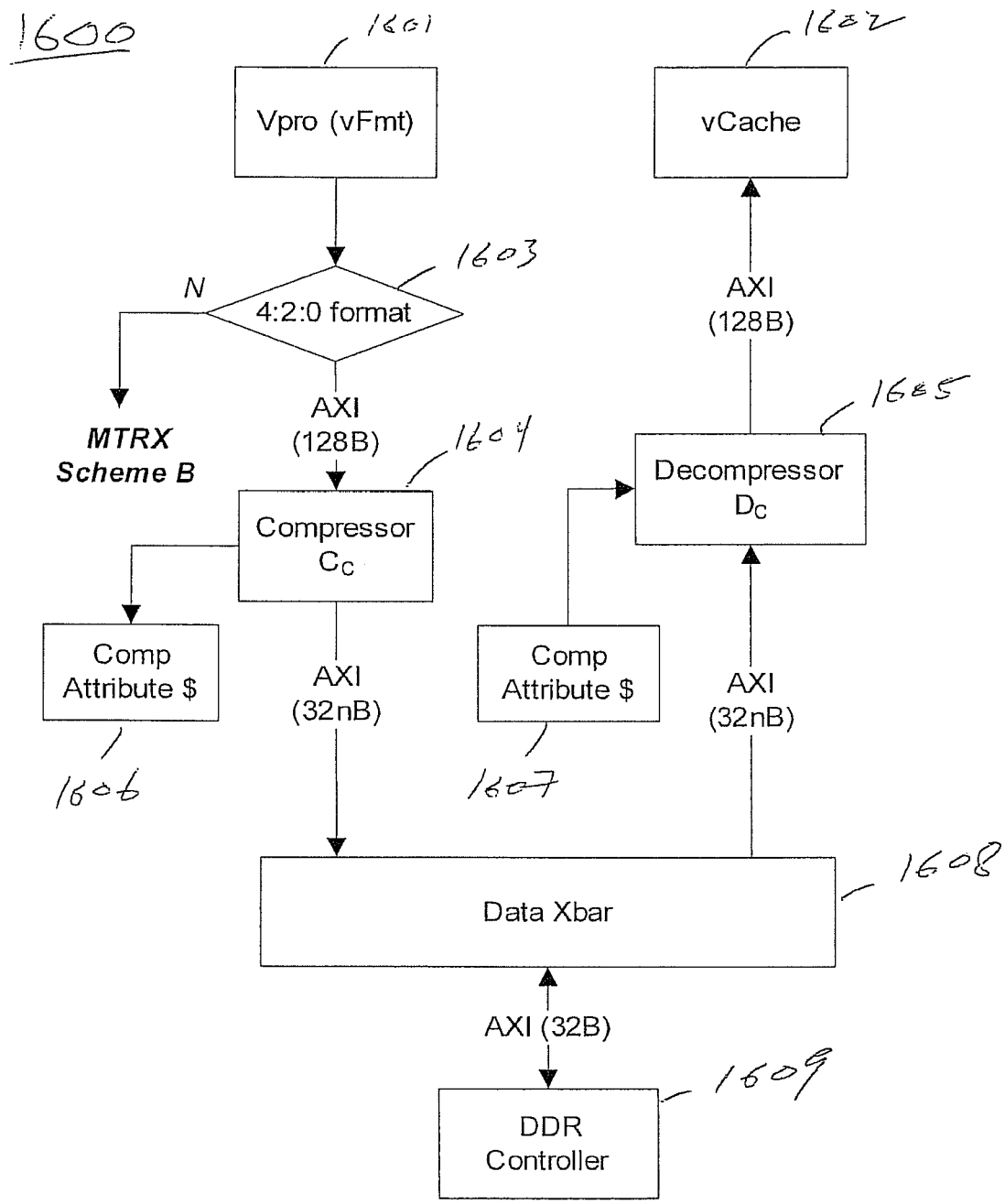
FIG. 16 is a block diagram of yet another image processing scheme according to an embodiment of the present invention.

As shown in FIG. 16, the block diagram of MTR scheme C 1600 is demonstrated. There are two major data paths:

1. The VPro 910 (FIG. 9) 4:2:0 output data is losslessly compressed and sent to DDR 901;
2. The vCache 911 reads the video data from DDR 901 and decompresses the data;

In this scenario the lossless compression is conducted on 8-bit luma/chroma values of reference frames, for example Y data (or UV data) in video frames. As mentioned above, a tile-based memory structure may be used for storing data without compression, in which Y and UV data are stored in separate locations and each tile represents 8×4 pixels (with 8-bit intensity value). It may be desirable for MTR logic to be transparent to vCache 911 of FIG. 9 or to minimize any required modification on these modules.

Software may determine and program whether 2 or 4 neighboring tiles are coupled for the lossless compression process. If 4 neighboring tiles are couple, the input data is 32×4 (128B), the compression ratio for each block is stored in the 2-bit attribute table.

In the FIG. 16, there are 3 MTR related modules:

1. Compressor 1604: the input is in fixed 32×4 pixel data unit (128B) and each pixel is in Y or UV format, and the output and the compression ratio are determined by QP and the upper bound ratio.
2. Decompressor 1605: executes the reversed process of the compressor, whose input is 32nB (n=1, 2, 3, 4) compressed data, and the output is 32×4 pixels;
3. Compression attribute engine 1606-1607: fetches or stores attribute information to the attribute cache. A 2-bit attribute is used to represent the value of n, which directly reflects the compression ratio. In the compression/decompression process, the compressor 1604 determines the attribute n and stores it for decompressor 1605 to fetch n bursts in the future for decoding.

MTR Scheme D

Figure 17:
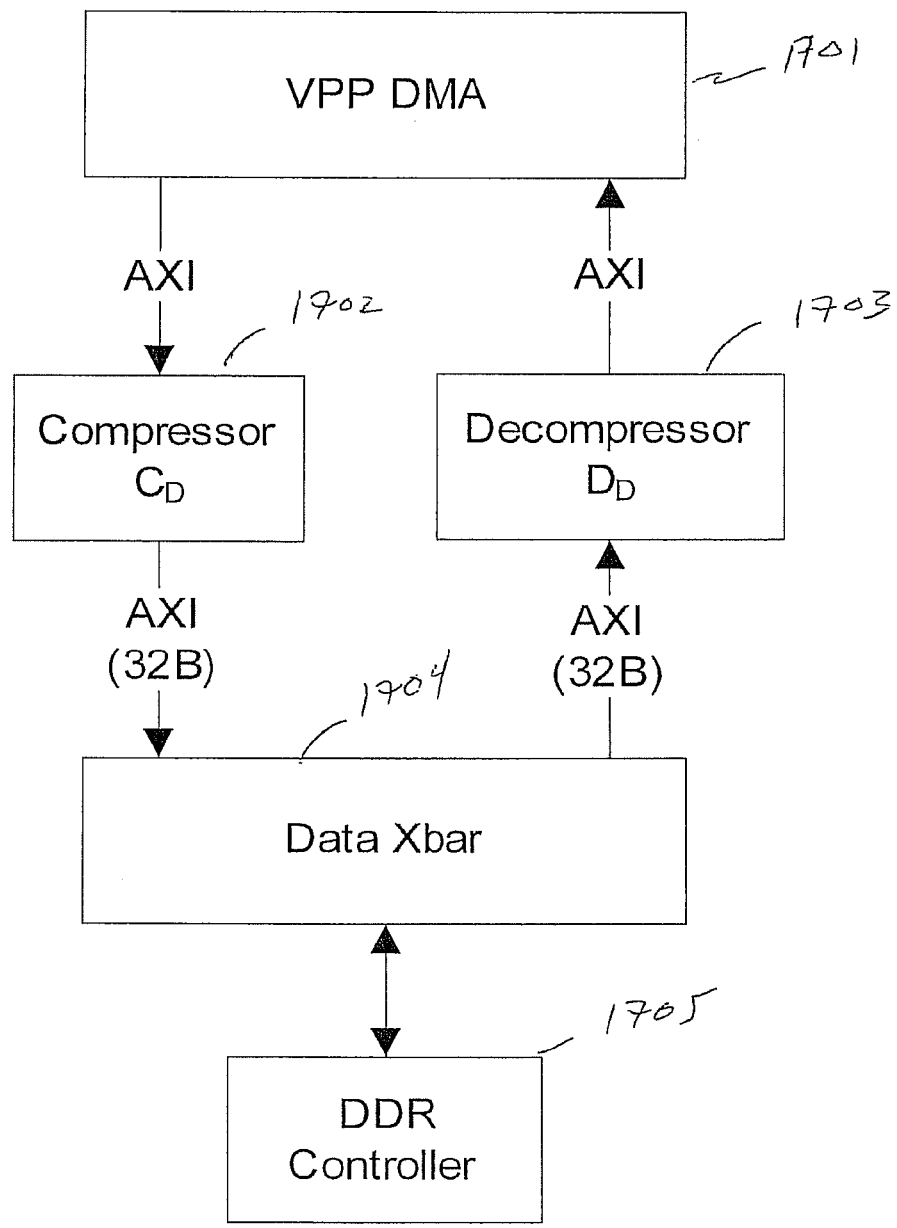
FIG. 17 is a block diagram of yet another image processing scheme according to an embodiment of the present invention.

As shown in FIG. 17, the block diagram of MTR scheme D is demonstrated. There are two major data paths:

1. The VPP DMA 1701 writes the compressed main video data and motion information to DDR 901;
2. The VPP DMA 1701 reads the data from DDR 901 and decompresses the data;

In FIG. 17, there are 2 MTR related modules:

1. Compressor 1702: the input is in a fixed 64 byte data unit with packed pixels in 20-bit format (16-bit UYVY+4-bit motion), and the output and the compression ratio are determined by QP and the Upper bound ratio; and 2. Decompressor 1703: executes the reversed process of the compressor, whose input is 32nB (n=1, 2, 3, . . . , 8) compressed data, and the output is 256 byte data;

Both the input and output data of compressor 1702 and decompressor 1703 are in linear structures. Therefore, no line buffer is needed in this scenario. The compression ratio is purely determined by the QP selected. Therefore, the quantized coefficients are losslessly compressed in the compressor and restored in the decompressor. The bit rate-centric requirements may not be supported in this scheme. That is, the exact 1/2 or 1/4 compression ratio may not be guaranteed by this scheme.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for compressing image data, the method comprising:
   receiving image data as a plurality of arrays of pixels;
   transforming the arrays of pixels to produce corresponding matrices of coefficients;
   coding the matrices of coefficients using a first image coding process to produce a coded bit stream; and
   comparing the coded bit stream to a bit rate constraint,
   wherein if the coded bit stream satisfies the bit rate constraint, then the coded bit stream is produced as an output, and
   wherein if the coded bit stream does not satisfy the bit rate constraint, then the matrices of coefficients are coded using a second image coding process to produce the coded bit stream.

2. The method of claim 1, wherein the first image coding process is a variable length coding process.

3. The method of claim 1, wherein the second image coding process is a layered coding process.

4. The method of claim 3, wherein the layered coding process associates different coefficients with different coding layers, and wherein different coding layers are coded with different priorities.

5. The method of claim 1, wherein:
   receiving image data comprises receiving a plurality of different image data inputs in a plurality of different formats; and
   the method further comprises converting the different image data inputs to a common format.

6. The method of claim 1, further comprising converting a scan order of the coefficients.

7. The method of claim 1, further comprising quantizing the coefficients.

8. The method of claim 7, wherein if the coded bit stream satisfies the bit rate constraint, then the method further comprises including quantization bits in the bit stream.

9. The method of claim 8, further comprising coding the quantization bits using a layered coding process.

10. The method of claim 1, wherein coding the matrices of coefficients using the first image coding process comprises coding a DC coefficient in each matrix using a first variable length code, and coding AC coefficients in each matrix using a second variable length code.

11. The method of claim 10, further comprising classifying each matrix of coefficients into one of a plurality of pattern types based on a number of coefficients in each matrix having values that are less than one or more specified values.

12. The method of claim 11, wherein coefficient values that are less than said specified values are coded using a first variable length code, and coefficient values that are greater than said specified values are coded using a second variable length code.

13. The method of claim 11, wherein the one or more specified values comprises a first range and a second range.

14. The method of claim 13, wherein,
   if a first matrix of coefficients has a first number of AC coefficients that are within the first range, then said first number of AC coefficients are coded using a first variable length code, and
   if a second matrix of coefficients has a second number of AC coefficients that are within the second range, then said second number of AC coefficients are coded using a second variable length code.

15. The method of claim 1, further comprising encoding a quantization parameter and a compression ratio as compression attributes, and producing the compression attributes with said coded bit stream.

16. The method of claim 1, further comprising generating compression attributes, wherein the compression attributes specify either the first image coding process or the second image coding process.

17. An image processing system comprising:
   a memory; and
   an image processor to store and retrieve image data from the memory, the image processor further to:
      receive image data as a plurality of arrays of pixels;
      transform the arrays of pixels to produce corresponding matrices of coefficients;
      code the matrices of coefficients using a first image coding process to produce a coded bit stream; and
      compare the coded bit stream to a bit rate constraint,
      wherein if the coded bit stream satisfies the bit rate constraint, then the coded bit stream is produced as an output, and
      wherein if the coded bit stream does not satisfy the bit rate constraint, then the matrices of coefficients are coded using a second image coding process to produce the coded bit stream.

18. The image processing system of claim 17, wherein the second image coding process is a layered coding process.

19. The image processing system of claim 18, wherein the layered coding process associates different coefficients with different coding layers, and wherein different coding layers are coded with different priorities.

20. An image processing system comprising:
   a coder-decoder;
   an image processing block; and
   one or more pins to communicate image data between an external memory and the coder-decoder and image processing block,
   wherein image data is received in the coder-decoder on the one or more pins and is coded using a first image coding process,
   wherein said coder-decoder decodes the image data, and
   wherein the coder-decoder encodes the image data using a second image coding process and stores the coded image data in the memory for access by the image processing block.

* * * * *